United States Patent [19]

Fergason

[11] Patent Number: 5,061,041
[45] Date of Patent: * Oct. 29, 1991

[54] LIQUID CRYSTAL MOTION PICTURE PROJECTOR WITH MEMORY

[75] Inventor: James L. Fergason, Atherton, Calif.

[73] Assignee: Manchester R&D Partnership, Pepper Pike, Ohio

[*] Notice: The portion of the term of this patent subsequent to Sep. 15, 2004 has been disclaimed.

[21] Appl. No.: 604,794

[22] Filed: Oct. 26, 1990

Related U.S. Application Data

[60] Division of Ser. No. 189,311, filed as PCT US87/01821 on Jul. 30, 1987, Pat. No. 5,016,984, which is a continuation-in-part of Ser. No. 892,497, Aug. 1, 1986, Pat. No. 4,693,557, which is a continuation-in-part of Ser. No. 585,884, Mar. 2, 1984, Pat. No. 4,603,945, and a continuation-in-part of Ser. No. 608,135, May 8, 1984, Pat. No. 4,613,207.

[51] Int. Cl.⁵ .......................... G02F 1/13; G03B 21/00
[52] U.S. Cl. .......................................... 359/51; 359/41; 359/100; 353/122
[58] Field of Search .................. 350/331 R, 334, 336, 350/345; 353/23, 122

[56] References Cited

U.S. PATENT DOCUMENTS

| | | | |
|---|---|---|---|
| 3,578,844 | 5/1971 | Churchill et al. | 350/351 |
| 3,600,060 | 8/1971 | Churchill et al. | 350/331 R |
| 3,622,226 | 11/1971 | Matthies | 350/334 |
| 3,671,231 | 6/1972 | Haas et al. | 350/346 |
| 3,703,331 | 11/1972 | Goldmacher et al. | 350/350 R |
| 3,750,136 | 7/1973 | Roess | 350/331 R |
| 3,844,650 | 10/1974 | Nicholson et al. | 350/331 R |
| 3,988,056 | 10/1976 | Hareng et al. | 350/351 |
| 4,012,122 | 3/1977 | McVeigh | 350/331 R |
| 4,105,313 | 8/1978 | Altman | 353/65 |
| 4,110,794 | 8/1978 | Lester et al. | 350/330 |
| 4,194,833 | 3/1980 | Lester et al. | 350/331 R |
| 4,222,641 | 9/1980 | Stolov | 350/331 R |
| 4,239,345 | 12/1980 | Berreman et al. | 350/331 R |
| 4,279,152 | 7/1981 | Crossland | 350/340 |
| 4,288,822 | 9/1981 | Hareng et al. | 350/330 |
| 4,294,524 | 10/1981 | Stolov | 350/333 |
| 4,297,022 | 10/1981 | Lester | 350/331 R |
| 4,334,734 | 6/1982 | Hareng et al. | 350/331 R |
| 4,386,836 | 6/1983 | Aoki et al. | 350/346 |
| 4,389,096 | 6/1983 | Hori et al. | 350/339 R |
| 4,435,047 | 3/1984 | Fergason | 350/334 |
| 4,603,945 | 8/1986 | Fergason | 350/331 R |
| 4,606,611 | 8/1986 | Fergason | 350/334 |
| 4,613,207 | 9/1986 | Fergason | 350/331 R |
| 4,693,557 | 9/1987 | Fergason | 350/331 R |

FOREIGN PATENT DOCUMENTS

| | | |
|---|---|---|
| 2139537 | 1/1973 | France . |
| 58-27124 | 2/1983 | Japan . |
| 8301016 | 3/1983 | PCT Int'l Appl. . |

*Primary Examiner*—Stanley D. Miller
*Assistant Examiner*—Anita Pellman Gross
*Attorney, Agent, or Firm*—Renner, Otto, Boisselle & Sklar

[57] ABSTRACT

A liquid crystal moving picture projector (1) includes a liquid crystal imager (2) for creating characteristics of an image, and projection optics (3) for projecting images sequentially created by the imager, the imager including a liquid crystal material (4) capable of temporarily storing information at respective areas thereof to create image characteristics capable of being projected sequentially by the projection optics. The temporary storage may be a function of charge storage directly on liquid crystal material or by structural storage characteristics relying on bulk effect of smectic liquid crystal. A method of projecting plural images in sequence includes creating an image or characteristics of an image in a liquid crystal material, storing such image in such liquid crystal material, directing light at such liquid crystal material, projecting such image as a function of light transmitted through or scattered by such liquid crystal material, and creating a further image in such liquid crystal material for subsequent projection.

76 Claims, 8 Drawing Sheets

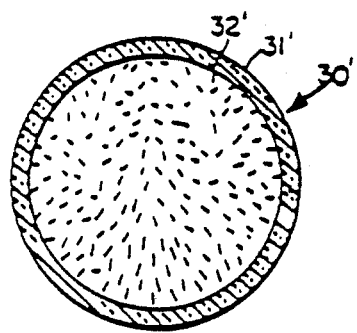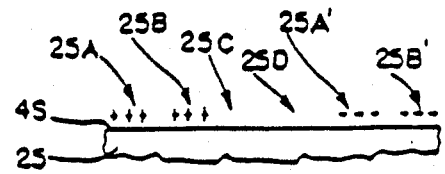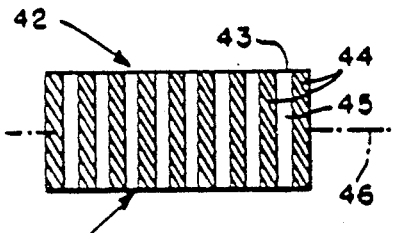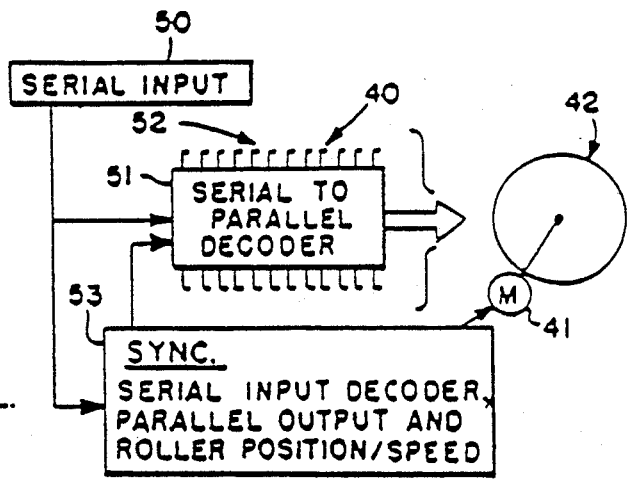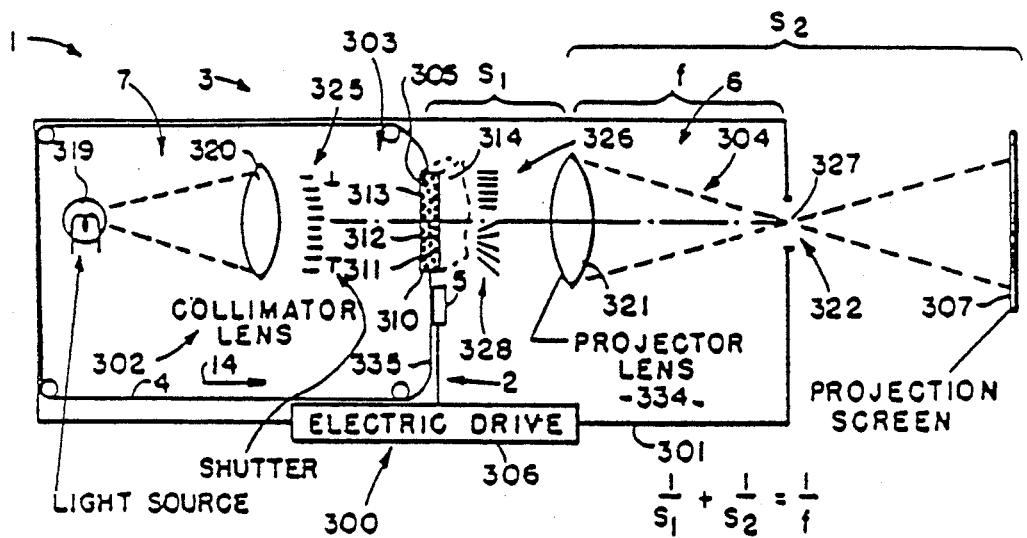

LIQUID CRYSTAL MOTION PICTURE PROJECTOR WITH MEMORY

This is a Division of U.S. patent application Ser. No. 07/189,311, filed as PCT US87/01821 on Jul. 30, 1987, now U.S. Pat. No. 5,016,984 issued May 21, 1991; which is a Continuation-In-Part of U.S. application Ser. No. 06/892,497, filed on Aug. 1, 1986, now U.S. Pat. No. 4,693,557; which is a Continuation-In-Part of both U.S. patent application Ser. No. 585,884, filed Mar. 2, 1984, now U.S. Pat. No. 4,603,945, and U.S. patent application Ser. No. 608,135, filed May 8, 1984, now U.S. Pat. No. 4,613,207. The entire disclosures of such patent applications hereby are incorporated by reference.

CROSS REFERENCE TO RELATED APPLICATIONS

Reference is made to applicant's commonly assigned, U.S. Pat. Nos. 4,435,047, issued Mar. 6, 1984, for "Encapsulated Liquid Crystal and Method"; 4,606,611, issued Aug. 19, 1986, for "Enhanced Scattering in Voltage Sensitive Encapsulated Liquid Crystal"; 4,616,903, issued Oct. 14, 1986, for "Encapsulated Liquid Crystal and Method"; 4,662,720, issued May 5, 1987, for "Colored Encapsulated Liquid Crystal Devices Using Imbibition of Colored Dyes and Scanned Multicolor Displays"; 4,596,445, issued June 24, 1986, for "Colored Encapsulated Liquid Crystal Apparatus Using Enhanced Scattering"; and Ser. No. 585,883 for "Encapsulated Liquid Crystal Material, Apparatus And Method", filed Mar. 2, 1984; the entire disclosures of such patents and applications hereby are incorporated by reference.

TECHNICAL FIELD

The present invention relates generally to projectors and, more particularly, to a liquid crystal moving picture projector and method. In one embodiment of the invention light incident on a liquid crystal display-type device or imager selectively is scattered or transmitted by respective portions of the liquid crystal display, and a projection mechanism projects an image formed by either such scattered light or such transmitted light. (As used herein in connection with the invention the terms liquid crystal display and liquid crystal imager are intended to be synonymous and equivalent).

BACKGROUND

A conventional optical moving or motion picture projector may include a light source, an input image device holder, such as a film guide, sprockets, shutter, etc., or by which a film, and particularly the frames thereof, may be placed for illumination by light from the light source, and a lens system for projecting an image of the illuminated frame. Typically the film would have optically transparent portions and optically absorbent portions, e.g., black and/or colored portions. When projected onto a screen, such black portions appear black due to absorption of light by the light absorbing, e.g., black emulsion, material, and the optically transmissive portions would appear relatively bright on the screen. Common exemplary projectors are of 8, 16, and 32 millimeter sizes, depending on the size of the film used.

One problem with conventional projectors is the large amount of heat that is absorbed by the light absorbing portions of the film, which could cause destruction or damage to the film; to minimize such heat build-up it often is necessary to use one or more infrared or heat absorbing filters optically upstream of the film. The heat dissipated in the heat filters and at the optical source or cabinet containing the same requires elimination, for example by a blower or other means. The blower may produce undesirable noise and/or vibration and uses energy that would not have to be consumed if the heat did not require such elimination. A further disadvantage of conventional projectors is the diffraction of light at the interface between light absorbing material, such as a black emulsion, and transparent material of the film; such diffraction can reduce the contrast and quality of the projected image seen on a screen. Furthermore, in conventional film projectors, contrast would be reduced since images are formed in part, at least, by the blockage of light, and such blockage is a function of absorption, which can vary, depending on the quality of opaqueness of the blocking material. Other disadvantages of conventional motion picture projectors is the size and number of reels of film needed to project an entire motion picture, story, etc., due to the relatively fixed nature of the respective images and scenes in the film.

Liquid crystal material currently is used in a wide variety of devices, including, for example, optical devices such as visual displays. A property of liquid crystal material enabling use in visual displays is the ability to scatter and/or to absorb light when the liquid crystal structure is in a random alignment and the ability to transmit light when the liquid crystal structure is in an ordered alignment.

Frequently a visual display using liquid crystal material displays dark characters on a gray or relatively light background. In various circumstances it would be desirable, though, using liquid crystal material to be able to display with facility relatively bright characters or other information, etc. on a relatively dark background. It would be desirable as well to improve the effective contrast between the character displayed and the background of the display itself.

Examples of electrically responsive liquid crystal material and use thereof are found in the above patents and applications.

Currently there are three categories of liquid crystal materials, namely cholesteric, nematic and smectic. In one embodiment of the present invention nematic liquid crystal material, a combination of nematic and some cholesteric type or smectic type is used. More specifically, the liquid crystal material preferably is operationally nematic or operationally smectic, i.e. it acts generally as nematic or smectic material and not as the other types. Operationally nematic means that in the absence of external fields structural distortion of the liquid crystal is dominated by the orientation of the liquid crystal at its boundaries, e.g. with a surface, such as the surface of a capsule-like volume, rather than bulk effects, such as very strong twists as in cholesteric material, or layering as in smectic material. Thus, for example, chiral ingredients which induce a tendency to twist but cannot overcome the effects of boundary alignment still would be operationally nematic. Such material should have a positive dielectric anisotropy. Although various characteristics of the various liquid crystal materials are described in the prior art, one known characteristic is that of reversibility. Particularly, nematic liquid crystal material is known to be reversible (and that characteristic is desirable in the present invention), but cholesteric material ordinarily is not reversible.

In another embodiment of the invention smectic or operationally smectic liquid crystal material or a combination of liquid crystal materials that operate as smectic liquid crystal material may be used. A characteristic of smectic liquid crystal material making it useful in the present invention is structural storage or memory capability of such material, i.e., the ability to retain a particular alignment configuration until specifically reset to another alignment configuration. Another characteristic is the responsiveness to electric field to align with respect thereto.

It is also known to add pleochroic dyes to the liquid crystal material. One advantage to using pleochroic dye with the liquid crystal material is the eliminating of a need for a polarizer. However, in the nematic form a pleochroic device has relatively low contrast. In the past cholesteric material could be added to the nematic material together with the dye to improve contrast ratio. See for example the White et al article in *Journal of Applied Physics*, Vol. 45, No. 11, November 1974, at pages 4718-4723. However, although nematic material is reversible, depending on whether or not an electric field is applied across the same, cholesteric material ordinarily would not tend to its original zero field form when the electric field would be removed and this characteristic may detrimentally affect the quality of a display that uses nematic and cholesteric liquid crystal and pleochroic dye. For example, a disadvantage to use of pleochroic dye in solution with liquid crystal material is that the absorption of the dye is not zero in the field-on condition; rather, absorption in the field-on condition follows an ordering parameter, which relates to or is a function of the relative alignment of the dyes.

Usually liquid crystal material is anisotropic both optically (birefringence) and, for example in the case of nematic material, electrically. In optically anisotropic liquid crystal material there is a difference between the ordinary index of refraction and the extraordinary index of refraction the liquid crystal material. The optical anisotropy is manifest by the scattering of light when the liquid crystal material is in random alignment, and the transmission of light through the liquid crystal material when it is in ordered alignment. The electrical anisotropy may be a relationship between the dielectric constant or dielectric coefficient with respect to the alignment of the liquid crystal material.

In the past, devices using liquid crystal, such as visual display devices, have been relatively small. Use of encapsulated liquid crystals disclosed in applicant's above mentioned patents and co-pending applications has enabled the satisfactory use of liquid crystals in relatively large size displays, such as billboards, etc., and another large (or small) scale use may be as an optical shutter to control passage of light from one area into another, say at a window or window-like area of a building. The present invention relates to improvements in such encapsulated liquid crystals using the same as a device on which plural frames can be created to represent an image or characteristics of an image and to the utilization of the light scattering and transmitting characteristic of the liquid crystal material for projection purposes.

As used herein with respect to the present invention, encapsulated liquid crystal material means liquid crystal material in a containment medium with a surface for distorting the natural structure of the liquid crystal in the absence of a prescribed input to cause scattering of incident light. Thus, a quantity of liquid crystal material is contained in a volume or volumetric space in the containment medium. The respective volumetric spaces may be substantially closed, may be capsule-like, may be like cells in stable emulsion or matrix, and/or may be interconnected with other volumetric spaces, and so on. According to a preferred embodiment, the encapsulated liquid crystal material is represented by a plurality of volumes of liquid crystal in a containment medium formed as an emulsion of the liquid crystal material and the containment medium. Such emulsion should be a stable one. Various methods for making and using encapsulated liquid crystal material and apparatus associated therewith are disclosed below and in applicant's patents and co-pending patent applications, which are incorporated by reference.

Liquid crystal projectors and projection optics are disclosed in applicant's above-mentioned U.S. Pat. No. 4,613,207. Liquid crystal imagers which create an image or characteristics of an image using charge storage techniques are disclosed in applicant's above-mentioned U.S. Pat. No. 4,603,945. The present invention relates to a liquid crystal motion or moving picture projector utilizing such projectors and projection optics and charge storage and other imager techniques, and/or structural storage imager techniques to create a plurality of images or characteristics of images capable of sequential projection by the projector. Structural storage imager technique relies on the ability of the liquid crystal to maintain or to store a particular alignment of liquid crystal structure until a further input, such as heat (or thermal, the two terms being used equivalently herein) or electrical input, is applied thereto.

As used herein, the terms liquid crystal display and liquid crystal imager are intended to be equivalent and interchangeable. The liquid crystal display or imager creates the image or the characteristics of the image intended to be projected by the projector or projection optics.

BRIEF SUMMARY OF INVENTION

Essentially the invention relates to a moving piece of liquid crystal material that can produce an image, information or a set of information to establish characteristics of an image (image, information, and seet of information, etc. being used interchangeable herein) capable of being projected such that while the image at one part of the piece of liquid crystal material is being projected, an image can be put on another part of the liquid crystal material for subsequent projection. Such procedure may be repeated to provide a series of images that can be sequentially projected to provide the appearance of motion and other effects characteristic of a motion picture. Moreover, such image can be written onto the liquid crystal material in real time just prior to projection of the image or may be stored for a period of time, depending on circumstances, and in the usual case the liquid crystal material would have multiple areas at each of which a plurality of images would be written at different times for sequential projection. The images may be stored by relying on electrical charge storage on the liquid crystal material and/or by relying on structural storage characteristics of the liquid crystal material itself. The liquid crystal material may serve as a mechanical transfer medium that both receives and stores the image and transfers the image into projection optics for projection of the image.

Briefly, the motion picture projector of the invention includes a projector or projection optics for projecting an image, a liquid crystal member (sometimes referred to below as a device, film or disk) having a capability of at least temporarily storing characteristics of an image for projection, and an input device for selectively applying input to the liquid crystal member to create a desired image.

In one embodiment of the invention the liquid crystal member is written to or on electrically to create characteristics of an image, e.g., by applying electrical charge for temporary storage by the liquid crystal member; and such image characteristics may dissipate naturally and/or may be eliminated by dissipation or removal of such electrical charge.

In another embodiment electrical charge may be used to write to or on the liquid crystal member to create characteristics of an image; and such image characteristics may be dissipated or removed by applying heat (or thermal energy) to the liquid crystal member.

In a further embodiment an electrical input may be used to erase the liquid crystal member; and, thereafter, heat energy may be selectively applied, e.g., by laser techniques, to write to or on the liquid crystal member.

An input device selectively applies appropriate inputs, e.g. electrical or thermal, to the liquid crystal member to create plural image frames that can be moved sequentially into the projection optics which in turn projects the frames sequentially. To create a given image frame, the input is applied to selected areas of the liquid crystal member to determine which areas of the liquid crystal film will scatter light and which areas will transmit light without scattering. After a given frame has been projected, it is moved out of the projection optics and the next frame is moved into the projection optics for projection. Moreover, preferably after a frame has been projected and moved out of the projection optics and prior to the next input being applied to such frames, the remnants of the original input are removed or eliminated.

The projection optics may include an aperture intended to block scattered light and to transmit light which is essentially transmitted through the liquid crystal member for focusing and/or projection onto a screen or other surface on which the projected image is formed. Alternatively, the projection optics may include a mask which blocks the transmitted light and a lens which gathers or collects the scattered light for projection onto the screen as the viewable projected image.

The liquid crystal member or "film" used in the invention may be an endless strip or loop of film formed of a flexible transparent support and encapsulated liquid crystal.

In another embodiment the liquid crystal member may be a disk of liquid crystal material in a containment medium. Such disk may be relatively rigid or relatively flexible. Moreover, such disk may include the same components as the flexible strip mentioned above. It will be appreciated that other types of liquid crystal members also may be used according to the present invention for the purpose of creating characteristics of an image capable of being projected, one example would be an oscillating cell or piece of liquid crystal material having two areas on which information may be written—one area would be aligned for projection of information thereon while information is written to the other area and then the second area would be projected while the first area is refreshed or rewritten.

Such liquid crystal member, then, in a sense is a liquid crystal display or imager that has formed therein one or more image frames capable of sequential projection by the projection optics.

The liquid crystal display taking the place of the transparency or conventional film in the projector of the invention preferably has the ability to effect scattering, preferably generally isotropic scattering, of light or to transmit light. In one embodiment the display is formed of plural volumes of liquid crystal material in a containment medium. Those volumes may be fluidically isolated or interconnected or both.

According to the invention, the liquid crystal material in the containment medium preferably has two principal conditions or modes of operation as a function of alignment of liquid crystal structure within the containment medium. In one alignment condition the liquid crystal structure is distorted from the straight line structure usually taken on by the liquid crystal material when not confined or distorted by a surface, wall, etc. In the other alignment condition the liquid crystal material is in such straight line configuration. Such structures, interaction of the liquid crystal material with the containment medium to achieve the distorted structure condition, and response of the liquid crystal material to a prescribed input, such as an electric or magnetic field, to achieve a parallel aligned condition overcoming distorting forces of the containment medium are described in the above-mentioned patents and applications.

Moreover, operation of such liquid crystal material in a containment medium for transmitting or scattering light also is described in detail in such above-mentioned patents and applications. Summarizing such operation here, for transmitting light through a particular part of the liquid crystal member or display, the liquid crystal material in the containment medium forming that part of the member preferably is aligned generally in parallel with the direction of incident light and preferred light transmission; and the ordinary index of refraction of such liquid crystal material is selected to be at least substantially the same as the index of refraction of the containment medium. The liquid crystal material and containment medium may be optically transparent. Since the light does not experience changes in index of refraction during transmission through the containment medium and liquid crystal material, it is transmitted without refracting, bending, scattering, etc.

On the other hand, when the liquid crystal structure is in the mentioned distorted alignment condition, incident light tends to be scattered rather than directly transmitted. Such scattering is due to the selecting of the extraordinary index of refraction of the liquid crystal material to be different from the index of refraction of the containment medium and the preferred non-flat shape of the containment medium walls bounding or confining the liquid crystal material. Such scattering further is enhanced due to changes in index of refraction of the liquid crystal material through a volume thereof, as the degree of distortion and shape of liquid crystal structure through the volume of liquid crystal material would be expected to be generally non-uniform.

Preferably the encapsulated liquid crystal material is nearly completely isotropically scattering when in distorted or curvilinear alignment; at least such liquid crystal material preferably effects as much isotropic scattering as is possible. Isotropic scattering means that when a beam of light enters the liquid crystal material there is virtually no way to predict the exit angle of scattered light. Alternatively, the distorted encapsulated liquid crystal material may effect generally forward, but generally random or uncollimated or unfocused forward scattering of light. On the other hand, in the parallel aligned condition, the encapsulated liquid crystal material effectively becomes optically transparent.

The liquid crystal may include pleochroic dye, e.g., cooperative in guest-host relation, if absorption characteristics are desired. The liquid crystal and/or the containment or support medium may include non-pleochroic dye for coloring light transmitted therethrough. A liquid crystal color filter having only one color or multiple colors may be used to color light projected by the projector.

As it is used herein with respect to the invention, the terms distorted alignment, random alignment, curvilinear alignment and field-off condition means essentially the same thing; namely, that the directional orientation of the liquid crystal molecules or structure is distorted to an effectively curved configuration. Such distortion is effected, for example, by the wall of respective volumes or capsules containing the liquid crystal.

On the other hand, as it is used herein with respect to the invention, parallel aligned, ordered alignment, and field-on condition means that the liquid crystal material in a volume, capsule, etc., is generally aligned in parallel, for example with respect to a currently or previously applied electric field.

The present invention provides the ability to produce relatively rapidly an image of alphanumeric, graphical, pictorial, etc., data, information, images, etc., from information received from a remote source and/or from a local source. Importantly, the invention permits the formation of an image in real time or substantially in real time, e.g., essentially immediately on receipt of the incoming data or information, and that image is stored for a period that is adequate to permit projecting of the image.

According to another aspect of the invention, an imager includes a liquid crystal member having an alterable optical function for affecting the transmission, scattering or absorption of light incident thereon, a support for supporting the liquid crystal member in sheet-like, strip-like (e.g. an endless loop or strip), disk-like, etc., lay out, the liquid crystal device being responsive to a prescribed input to alter such optical function and being operative to form characteristics of an image, an input device for selectively applying the prescribed input to respective portions of the liquid crystal member, and the liquid crystal member having a memory function for at least temporarily storing the image characteristics after termination of a direct input thereto by the input device.

Importantly, since the liquid crystal member has the characteristic of being able to store image characteristics for a period of time, it is possible to "write" images onto the liquid crystal member at a different speed than the image is carried into the projection optics, is projected, and is removed from the projection optics. For example, using relative motion and/or other techniques, the speed with which the liquid crystal member passes a "write" zone and the time in that zone to have a frame-like image written thereto may be different from the speed with which the frame is carried to the projection optics and the effective time in the projection optics. Consistently, the speed of erasing an image and the speed of writing also may be different.

According to a further aspect of the invention an apparatus for mechanically depositing electric charge to a surface of a sheet-like liquid crystal material having opposite surfaces, includes a dynamic electrode having plural electrode means respectively electrically isolated from each other for applying electrical surface charge with respect to selected surface areas of such sheet-like liquid crystal material, electrical means for applying an electrical voltage to respective electrode means, and movement means for effecting relative movement of said dynamic electrode and such sheet-like liquid crystal material.

In one embodiment of the invention the liquid crystal device of the imager includes encapsulated liquid crystal material formed as and/or supported on a sheet, strip or disk. Such encapsulated liquid crystal material is capable of absorbing, scattering, and/or transmitting light in response to a prescribed input, such as an electric field. The encapsulated liquid crystal material has an electrical capacitance characteristic and, therefore, is capable of temporarily storing an electrical charge applied thereto. Electrical charge selectively is applied to designated areas of the encapsulated liquid crystal material for temporary storage there. Characteristics of an image, then, are created by the encapsulated liquid crystal material as a function of the respective areas thereof that are storing an electrical charge (and also as a function of the magnitude of such stored electrical charge and the electric field produced thereby) and those areas of the liquid crystal material where there is no electrical charge stored. A scanning or addressing mechanism according to the invention facilitates the scanning, traversing or relative movement of the encapsulated liquid crystal material selectively by a dynamic electrode or other means to apply such electrical charge thereto. The image characteristics formed by the encapsulated liquid crystal material may be projected. Moreover, after such image characteristics contained in a frame-like area of the liquid crystal member have been projected, that frame may be erased or, alternatively, permitted to have the image dissipate and, thus, effectively self-erase. Preferably the encapsulated liquid crystal material is of the operationally nematic type, which has the advantageous characteristics of prompt response to the application or removal of an electric field, reversability, and the ability to scatter, to absorb, and/or to transmit light controllably in response to the application or removal of such prescribed input.

Another aspect of the invention relates to use in a projector, or the like, particularly a motion picture type of projector, of a liquid crystal member that has qualities permitting image characteristics to be written thereto, permitting the image characteristics to be stored thereby, and permitting the image characteristics to be erased therefrom.

An example of a liquid crystal member having such qualities is the combination of a smectic liquid crystal material contained in volumes formed in a containment medium. The smectic liquid crystal material may have different ordinary and extraordinary indices of refraction with the ordinary index of refraction being match to the index of refraction of the containment medium. Therefore, depending on whether the smectic liquid crystal material is in parallel alignment or in distorted alignment, the smectic liquid crystal member would function optically generally in the manner summarized above.

Smectic liquid crystal material has a memory characteristic for structural alignment thereof. Distorted alignment of the smectic liquid crystal may be achieved by heating the liquid crystal material to a temperature above the isotropic temperature thereof. Thereafter, upon cooling of the liquid crystal material to a temperature below the isotropic temperature, the structure thereof will conform according to or otherwise be forced by the walls of the containment medium to the distorted alignment configuration. Such liquid crystal structure will remain distorted until subjected to a further input, such as an electric field that is great enough to cause the liquid crystal structure to align with respect thereto. Moreover, due to the memory characteristic of the smectic liquid crystal material, the parallel aligned structure thereof will remain even after removal of the electric field.

With the foregoing in mind, then, an embodiment of the invention using a smetic liquid crystal member (or one or more sequential frames thereof traveling through the projector of the invention) may be made fully scattering by subjecting the same to adequate heat to raise the temperature, say of a given frame thereof, above the isotropic temperature and then allow the liquid crystal material to cool to assume distorted structural configuration. Thereafter, selective application of electric field to areas of such frame will cause parallel alignment of liquid crystal to reduce scattering at such respective areas. Such application of electric field may be in a sense temporarily permanent, i.e. by temporarily storing the electric charge on the surface of selected portions of the frame, as was described above; alternatively, such electric field may be applied by separate electrode members, etc., between which the frame passes, since the aligned condition of liquid crystal structure will remain after the termination of the electric field until the heat to erase step is carried out again.

It is noted that the time during which the smectic liquid crystal material memory functions to retain the parallel alignment within a volume of containment medium that is attempting to act on the liquid crystal structure to distort it may vary according to the material used. However, it is desirable that such memory time be adequate to permit projecting the image before the image characteristics of a frame are lost or are so dissipated as to reduce substantially the quality of the projected image.

According to another embodiment of the invention using liquid crystal material with a memory, such as smectic liquid crystal material, electric field may be used to erase one or more frames of the liquid crystal member by aligning the liquid crystal material thereof in parallel with such field, thus making such frame(s) optically transparent. Thereafter, selective application of thermal energy (heat) to prescribed areas of a frame or frames could be used to write information to the frame. Such application of thermal energy would be adequate to raise the area where so applied to a temperature above isotropic temperature, as aforesaid, to cause the liquid crystal structure there to enter isotropic phase; thereafter, upon cooling to a temperature below isotropic temperature such liquid crystal would be in distorted structural alignment to scatter light. A laser or other means may be used as the source of such thermal energy; the advantage of a laser is that conventional technology used to sweep a laser across a surface and to modulate the laser, e.g. as in laser printer devices, may be used to achieve the desired application of thermal energy with relatively high degree of precision and resolution of the created and projected image.

Rather than heating the smectic liquid crystal material to a temperature above the isotropic temperature to cause the smectic liquid crystal to assume distorted alignment, it may be possible, depending on the nature of the smectic liquid crystal material, to heat the smectic liquid crystal material to a temperature that is above the smectic nematic transition temperature. Above such transition temperature the liquid crystal structure would behave as nematic or operationally nematic liquid crystal so as to lose the memory characteristic of smectic liquid crystal material and, thus, to permit the liquid crystal structure to be distorted to curvilinear alignment by the walls of the containment medium acting thereon. Accordingly, in the description herein, reference to isotropic temperature of the liquid material is intended to mean not only the actual isotropic temperature but also may mean the smectic nematic transition temperature if the latter in fact would function to permit achieving the distorted structural alignment as is described.

Some terms used herein generally are defined as follows: "liquid crystal material" broadly refers to any type of liquid crystal material that will work in the context of the present invention, but preferably refers to nematic, smectic, operationally nematic or operationally smectic liquid crystal material. Such liquid crystal material may include pleochroic dyes, non-pleochroic dyes, chiral compounds, or other co-ingredients. A capsule refers to a containment device or medium that contains or confines a quantity of liquid crystal material, and "encapsulating medium" or "material" is that medium or material of which such capsules are formed. The capsules may be closed, e.g. as a closed sphere, having an interior volume containing liquid crystal material or may be partially closed so as to define a specified volume for containing the liquid crystal material while one or more passageways or other means actually interconnect the interior volumes of two or more such capsules. An "encapsulated liquid crystal" or "encapsulated liquid crystal material" means a quantity of liquid crystal material confined or contained in the capsules of either or both types formed by and/or in the encapsulating medium, for example in a solid medium as individual capsules or dried stable emulsions.

Capsules according to this invention generally have an approximately spherical configuration (though this is not, per se, a requisite of the invention) having a diameter from about 0.3 to 100 microns, preferably 0.3 to 30 microns, especially 0.5 to 15 microns, for example most preferred 1 to 5 microns. In the context of this invention, encapsulation and like terms refer not only to the formation of such articles as are generally referred to as capsules, but also to the formation of stable emulsions or dispersions of the liquid crystal material in an agent (an encapsulating medium) which results in the formation of stable, preferably approximately uniformly sized, particles in a uniform surrounding medium. Techniques for encapsulation, generally referred to as microencapsulation because of the capsule size, as well known in the art (see, e.g., "microcapsule Processing and Technology" by Asaji Kondo, published by Marcel Dekker, Inc.) and it will be possible for one skilled in the art, having regard to the disclosure herein, to determine suitable encapsulating agents and methods for liquid crystal materials.

A feature of the spherical or otherwise curvilinear surfaced capsules or volumes which generally confine the liquid crystal material therein in accordance with the present invention is that the liquid crystal material tends to be forced or distorted to a specific form, being folded back on itself in a sense as it follows and/or generally aligns parallel or normal to the capsule wall, so that the resulting optical characteristic of a given capsule containing liquid crystal material is such that substantially all light delivered thereto will be affected, for example, scattered (when no pleochroic dye is present) or absorbed (when pleochroic dye is present), when no electric field is applied, regardless of the polarization direction of the incident light. However, in response to application of an electric field to the encapsulated liquid crystal material, the liquid crystal structure aligns with the field and scattering or absorption of light is reduced.

In the case of smectic liquid crystal material, the memory characteristic of the liquid crystal is operative to maintain the parallel structural alignment thereof after removal of electric field even in the presence of the distorting forces applied by the containment medium walls. The duration of such memory may be very long or rather short, depending on the nature of the liquid crystal material, the magnitude of the forces tending to distort the straight line structure thereof, and so on. As was mentioned above, resetting of the smectic liquid crystal structure may be accomplished by heating the smectic liquid crystal material to a temperature that exceeds the isotropic temperature thereof and then allowing the liquid crystal material to cool to a temperature below such isotropic temperature.

Exemplary operationally nematic encapsulated liquid crystal material useful in the present invention is disclosed in applicant's above patents and co-pending U.S. patent applications. Exemplary operationally smectic liquid crystal material useful in the invention include:

Advantageous features inuring to the invention include improved contrast, coolness of operation, and versatility of the display and image. Contrast is improved over prior art photographic and transparency film displays, for example, because light is not absorbed by an emulsion or other absorbing material on the transparency; rather, in the invention light is scattered and blocked, not being permitted to pass through the aperture or is focused and blocked by a mask. Since light intentionally preferably is not absorbed by the liquid crystal display of the invention, heat energy does not have to be dissipated by the light absorbing material; therefore, the overall operation of the projector is cooler, a separate blower and/or heat filters could be eliminated, the potential of heat damage to the display is minimized, etc. Versatility of the projector according to the invention resides, for example, in the ability conveniently to change the phase of the image, for example, conveniently being able to project bright characters on a dark background or vice versa as well as the ability conveniently to change the image by changing the electrical input to the liquid crystal display and, therefore, controlling which portions of the display scatter and which portions transmit light. Also, color filters conveniently can be added at the light output of the projector.

These and other embodiments of the invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF DRAWINGS

In the annexed drawings:

FIG. 5 is a schematic illustration like FIGS. 3 and 4 showing an alternate embodiment of encapsulated liquid crystal;

FIG. 6 is a plan view of the rolling dynamic electrode of the imager of FIG. 2;

FIG. 7 is a schematic block diagram of the electronics portion of the imager of FIG. 2;

FIG. 8 is a fragmentary side elevation view of the sheet-like strip of liquid crystal material of FIG. 2 with respective surface charges applied to the surface thereof;

FIG. 9 is a schematic illustration of a liquid crystal projector in accordance with the present invention;

DETAILED DESCRIPTION

Figure 1:
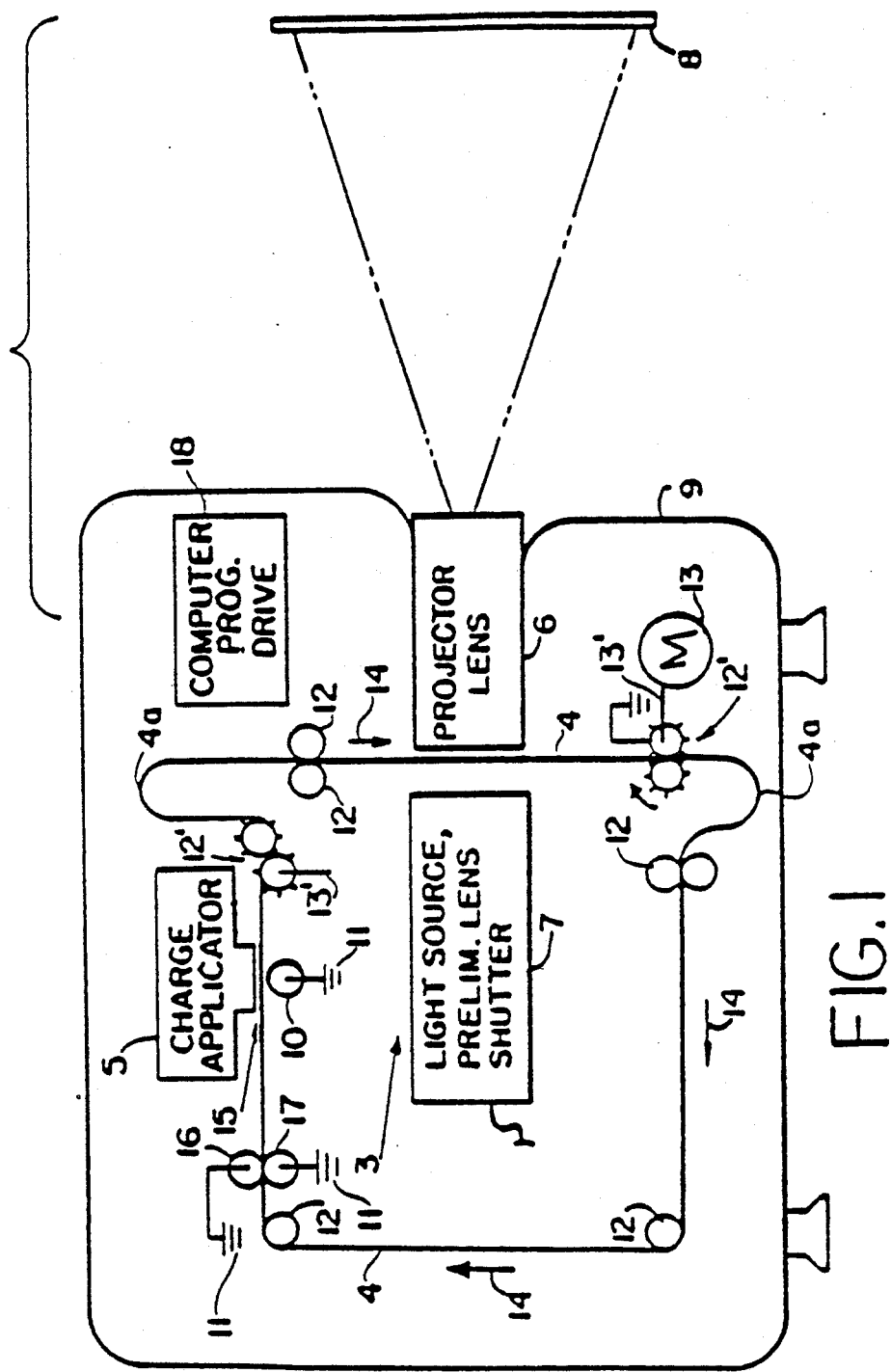
FIG. 1 is a schematic representation of a liquid crystal motion picture projector in accordance with the present invention.

Referring, now, in detail to the drawings, wherein like reference numerals designate like parts in the several figures, and initially to FIG. 1, a liquid crystal motion picture projector in accordance with the invention is designated 1. The projector 1 includes a liquid crystal imager or display device 2 and projection optics 3 for projecting images sequentially created by the imager 2. The imager 2, sometimes referred to as a liquid crystal display, includes a "film" in the form of a continuous strip 4 of liquid crystal material capable of temporarily storing charge to create characteristics of an image on a frame by frame basis that can be projected and a charge applicator 5 selectively to apply charge to the liquid crystal material to create the sequential images. The projection optics 3 includes a projection lens 6 and various other optics, such as light source, mask, shutter and lens systems generally designated 7 capable of projecting the sequential images created by the imager 2 onto a screen 8. A housing or case 9 may be provided to contain the parts 2-7 of the projector. If desired, the housing 9 may be light tight to prevent undesirable escape of light generated by the projection optics 3.

Details of the projection optics 3 will be described further below, for example with reference to FIGS. 9-15. Suffice it to say here that it is the function of the imager 2 to create plural frames of images or representations of images by liquid crystal that scatters light or transmits light without scattering it; and it is those images that are projected. Moreover, the imager 2 is capable of continuously supplying sequential images to the projection optics without the need for large reels of film or the like. Those sequential images are created at sequential locations on the continuous strip 4, are projected, and subsequently are replaced. After projection of an image and before replacement by another image, an image may be erased or allowed to dissipate.

The continuous strip 4 is formed of liquid crystal material that has a capacitance characteristic which enables charge to be stored on the surface 4S thereof. The surface charge together with an electrode, which is formed as part of the strip 4 and preferably is at a reference potential, such as ground, creates an electric field at a selected area of the strip between such charge and electrode. Temporary storage of such charge to provide electric field functions as a memory to retain the image characteristics of a frame until after it has been projected. Details of the imager 2, including of the strip 4 and of the charge applicator 5, will be described in further detail below.

The charge applicator 5 applies such charge preferably just prior to the projection optics 3 to minimize dissipation between the time the charge is applied and the time the image is projected. A metal roller 10 rolls against the strip 4 or at least part of it to make contact with the mentioned electrode to maintain the same at ground reference potential, as is seen at the connection 11 to a relative ground, for example. Such electrode preferably is continuous over the entire length and width of the strip and, therefore, is maintained at ground by such connection. Means other than the roller 10 may be used for such ground or other reference potential connection.

Additionally, the imager 2 includes plural rollers 12 along which the strip is moved during cyclical movement along a continuous path, as is seen in FIG. 1. A motor 13, such as a synchronous motor, may be used to drive one or one pair of the rollers 12', e.g. a sprocket type drive, to drive the continuous strip along its path designated by directional arrows 14. Preferably there are two pairs of drive sprockets 12' located in conventional manner with respect to the strip 4, and the motor 13 is coupled by a shaft 13' to turn such drive sprockets. Loops 4a may be provided in the film 4 as in a conventional motion picture projector to allow for a time delay of each frame to be retained in position in the projection optics 3 while the rest of the film 4 moves at a generally constant speed.

The charge applicator 5 is operative at a charge applying station 15 upstream of the projection optics 3. Therefore, promptly after the charge applicator 5 applies a charge to the strip to create an image in a given frame, such frame passes to alignment with the projection optics and the image therein is projected. There is no restriction of where on the length of the strip 4 an image forming a given frame is formed; however, there should be synchronization of the charge applicator 5, the movement of the strip 4 and the operation of the projection optics 3, such as the shutter, etc. thereof, to assure projection of a quality image.

Top and bottom (or input and output) loops 4' in the liquid crystal strip 4 may be provided using several pairs of rollers 12 and/or sprockets 12' in the usual fashion employed in conventional motion picture projectors. Such loops 4' in particular permit individual frames to remain in fixed position in the optical path of the projection optics 3 for a prescribed period of time for projection while the strip 4 outside such projection optics area is driven by the motor at a substantially constant speed.

Discharge rollers 16, 17 discharge any remaining charge on strip 4 prior to reapplication of charge by the charge applicator 5. Such discharge rollers 16, 17 preferably are electrically conductive material that couple to the surface 4S and to the strip electrode 27 (not shown in FIG. 1) to assure discharging. The discharge rollers 16, 17 preferably are connected to ground 11 or are otherwise connected to achieve the discharge function. The discharge rollers 16, 17 may have smooth cylindrical surfaces for good engagement with the surface 4S and the electrode 27; may be flat or stepped wiping surfaces either stationary or movable, e.g. a stepped surface would wipe an exposed edge of electrode 27; may be a series of wire-like projections that wipe across the strip 4; etc., to achieve the desired discharging function.

In the event that the charge on a given area, e.g. that forming a given frame, of the strip generally adequately dissipates before that area is re-presented to the charge applicator 5 for appropriate recharging, or if separate discharging is unnecessary prior to recharging by the charge applicator 5, the discharge rollers 16, 17 may be unneeded. Alternatively or additionally, the idler rollers 12 and/or drive sprockets 12' downstream of the projection optics may be electrically conductive and connected to ground to effect discharging function. Advantageously, the sprocket, for example, has teeth that pass through the strip and can be electrically conductive to form a good connection with the electrode 27 coupling the same to ground. The rollers 12 and drive sprocket 12' upstream of the projection optics 3 and between the projection optics and the charge applicator 5 may be electrically non-conductive so they do not discharge or dissipate stored charge.

The charge applicator 5 preferably is in the form of a dynamic electrode, as is described in detail below with reference to FIGS. 6-8. Moreover, associated with the charge applicator 5, and, if desired, considered a part of the imager 2 along with the strip 4, charge applicator 5 and various rollers and associated parts, is a computer/programmed drive 18. The drive 18 has as its function the control of the charge applicator 5 to determine at what areas of the strip charge is to be applied and at what areas charge is not to be applied. Moreover, the drive 18 may include means to determine the magnitude of such charge so that in a sense a gray scale function can be accomplished in the image projected onto the screen 8. Thus, in the computer/programmed drive 18 may be a memory, such as RAM, ROM, disk, tape, or other volatile or non-volatile memory, capable of storing information indicating when and where charge is to be applied or not to the strip to create a series of sequential image frames that can be projected to create a moving picture, for example. Alternatively, the computer/programmed drive 18 may include circuitry for detecting and/or decoding incoming information from another source, such as a local or remote computer, e.g. via a modem connection, to effect control of the charge applicator 5 to create the desired images on the strip 4.

In view of the foregoing brief description and the following detailed description, it will be appreciated, then, that the information to create sequential image frames on the strip 4 for projection by the projection optics 3 can be stored in a solid state or other electronic memory locally, i.e. at or in proximity to the projector 1, or may be received from a distant source.

Figure 2:
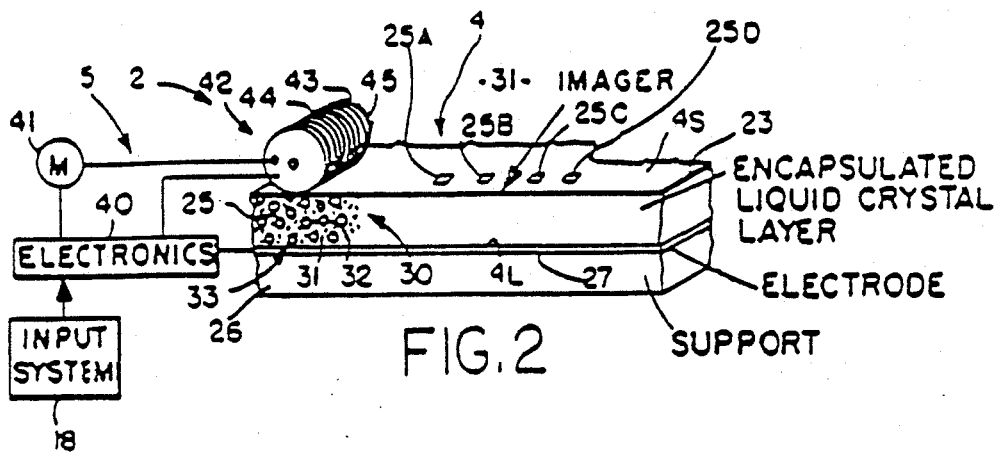
FIG. 2 is a fragmentary schematic side elevation/perspective view of a liquid crystal imager in accordance with the present invention.

Turning preliminarily to FIG. 2, the imager 2 preferably is capable of forming an image representing the information received from the drive 18 and applicator 5 essentially in real time, i.e. essentially at the same time that the information is received from the drive 18 without requiring any slow-down of the rate at which the input information is received. Additionally, the imager 2 is capable of storing or maintaining such image for a period adequate to permit projecting thereof by the projection optics 3 e.g. as a function of surface charge storage on the surface 4S of the strip 4. Furthermore, the liquid crystal strip 4, indeed the entire projector 1, preferably is capable of substantially continuous use to form one image after another and to project each of the images to create a moving or like image on the screen 8. The limitations on speed of operation of the liquid crystal projector 1 may be, for example, the rate at which information can be received at the applicator 5, the rate at which such input information can be converted to an image, which may be effected essentially simultaneously upon receipt of the information, and the operational speed of the strip 4 and projection optics 3. It is possible to apply the image characteristics to the strip 4 at a speed different than the speed the strip 4 travels through the projection optics 3, as is described further below.

The imager 2 converts input information received from the drive 18 and applicator 5 to an image on the strip 4 capable of being projected. The strip 4 includes an encapsulated liquid crystal layer 25 mounted for support on a sheet-like support 26, for example of Mylar or similar relatively strong optically transparent material. An optically transparent electrode 27 covers the surface 28 of the support 26 and separates the latter from the liquid crystal layer 25. The charge applicator 5, in response to the information received from the drive 18, applies a prescribed input, in the preferred embodiment a charge that produces an electric field, to selected areas on the surface 4S of the encapsulated liquid crystal layer 25 thereby to form an image represented by the information received.

The encapsulated liquid crystal layer 25 is encapsulated liquid crystal material 30 formed of a containment medium or encapsulating medium 31 and liquid crystal material 32. Exemplary materials for the containment medium 31 include, for example, polymers, for example polyvinyl alcohol (PVA), gelatin, latex and various other materials, for example which are mentioned in the aforementioned patent applications. Epoxy is another example of a containment medium. The liquid crystal material 32 preferably is nematic or operationally nematic and, for example, may be of one or more of the liquid crystal materials disclosed in the aforementioned patent applications. Alternatively the liquid crystal material 32 may be smectic or operationally smectic, as is described in further detail below. The containment medium 31 and liquid crystal material 32 cooperate to form a plurality of capsules, volumes, containment areas, or the like generally represented at 33, each of which may be closed or partly closed, in the latter case two or more of the so-called capsules may be fluidically coupled by interconnecting passageways like in a matrix formed of the medium and liquid crystal. The interior wall of a capsule generally tends to distort the structure of the liquid crystal material therein causing the same to assume a distorted or generally curvilinearly aligned structure, as opposed to the usual straight line parallel structure that nematic liquid crystal material tends to assume in the absence of a prescribed input, hereinafter referred to as an electric field, which is the preferred prescribed input in accordance with the invention. Such distorted structure typically would be aligned generally either parallel or normal to the capsule wall. However, in the presence of such electric field, the structure of the liquid crystal material 32 in the capsules 33 tends to align with respect to the field. On removal of the field again, though, the capsule wall effects the aforementioned distorted alignment. A plurality of capsules 33 preferably several capsules thick preferably make up the encapsulated liquid crystal layer 25 generally as is represented in the illustration of FIG. 2. The overall thickness of such layer 25 may be, for example, from about 0.3 mil to about 10 mils (about 0.5 mil being preferred), and the approximate diameter of each capsule may be, for example, from about 0.3 micron to about 100 microns, or one of the ranges above, with about 1 micron to about 5 microns being preferred. The capsules may be arranged in discrete layers or, more preferably, in a generally random, but nevertheless relatively close packed relation generally as is shown in the illustration of FIG. 2.

The shape of the interior surfaces of the volumes containing the liquid crystal material also should tend to distort the liquid crystal material when in a field-off or random alignment condition. A particular advantage to the preferred spherical configuration of the volumes is the distortion it effects on the liquid crystal therein when in a field-off condition. This distortion is due, at least in part, to the relative sizes of the volumes and the pitch of the liquid crystal; they preferably are about the same or at least about the same order of magnitude. Moreover, nematic liquid crystal material has fluid-like properties that facilitate the conformance or the distortion thereof to the shape of the capsule or volume wall surfaces in the absence of an electric field. On the other hand, in the presence of an electric field such nematic material will relatively easily change to ordered alignment with respect to such field.

The liquid crystal material 32 is optically anisotropic having ordinary and extraordinary indices of refraction; and the containment medium 31 preferably is substantially optically transparent, for example from the ultraviolet to the far infrared wavelength range. The index of refraction of the containment medium 31 and the ordinary index of refraction of the liquid crystal material 32, i.e. the index of refraction parallel to the optical axis of the liquid crystal (and occurring in the presence of an electric field which aligns the liquid crystal, as aforesaid) are optically matched so that in the presence of an electric field light may be transmitted substantially directly through the layer 25 without or at least with only a minimum of refraction at interfaces between liquid crystal material 32 and containment medium 31. However, the extraordinary index of refraction of the liquid crystal material should be different from the index of refraction of the containment medium thereby to increase the refracting and scattering of light in the encapsulated liquid crystal layer 5 in the absence of an electric field.

The electrical characteristics of the containment medium 31 and the liquid crystal material 32 are such that preferably in response to the application of a voltage thereto the major electric field produced thereby will be across the liquid crystal material and minimum voltage drop will occur across the encapsulating medium itself. Accordingly, the containment medium 31 should have a dielectric constant no less than the lower dielectric constant of the liquid crystal material, which is electrically anisotropic, and a relatively large impedance. Ideally, the dielectric constant of the encapsulating medium 31 should be close to the higher dielectric constant of the liquid crystal material, too.

Viewed on a so-called macroscopic or collective level, the encapsulated liquid crystal layer 25 essentially is a dielectric material having an average dielectric constant value, which may vary slightly during use, e.g. according to application or removal of an electric field to the liquid crystal material 32, and which also may be a function of the overall materials of which the layer 25 is composed. Accordingly, the encapsulated liquid crystal layer 25 has the ability to function as a capacitor storing an electric charge, namely a voltage, which may be applied thereacross. As is described further below, then, it is the function of the charge applicator 5 to apply surface charge to selected areas of the layer 25 for temporary storage and to create the image characteristics in the liquid crystal material for copying.

The usual free form structure of nematic liquid crystal and of smectic liquid crystal is parallel alignment. In nematic liquid crystal such parallel alignment generally is not further constrained. However, in smectic liquid crystal there is a further alignment constraing, whereby the parallel aligned liquid crystal also is orgainized in layers, which is what causes the so-called bulk effect structural storage characteristic of smectic liquid crystal. Both nematic and smectic liquid crystal materials used in the invention may be operative to assume a distorted alignment to scatter light and/or to effect light absorption, particularly if pleochroic dye is present, and may be operative to assume a parallel alignment in response to an electric (or magnetic) field to reduce such scattering or absorption. The nature of and mechanism to achieve such alignment is described below with respect to nematic or operationally nematic liquid crystal. The mechanism to effect such alignment of smectic liquid crystal is described further below.

Figures 3, 4:
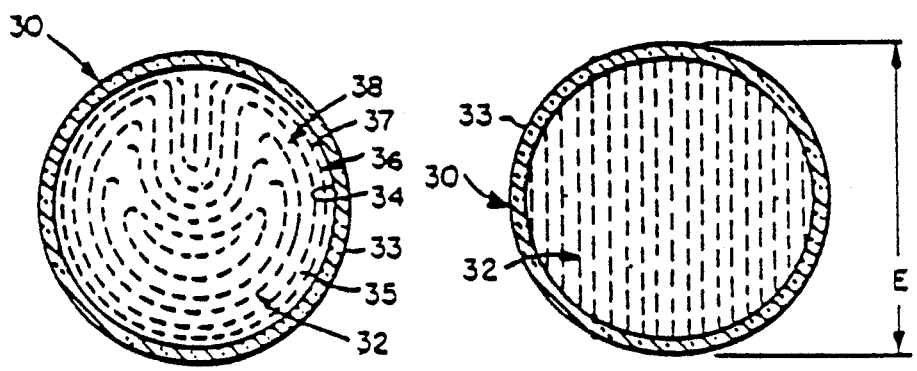
FIGS. 3 and 4 are enlarged schematic illustrations of a liquid crystal capsule in accordance with the present invention respectively under a no-field condition and under an applied electric field condition.

Turning to FIGS. 3 and 4, a schematic representation of a single capsule 33 containing liquid crystal 32 is shown, respectively, in the field-off and field-on conditions. The capsules 33 are spherical and have a generally smooth curved interior wall surface 34 defining the boundary for the interior volume or volumetric space 35 thereof. The actual dimensional parameters of the wall surface 34 and of the overall capsule 33 are related to the quantity of liquid crystal 32 contained therein and possibly to other characteristics of the individual liquid crystal material therein. Additionally, the capsule 33 applies a force to the liquid crystals 32 tending to pressurize or at least to maintain substantially constant the pressure within the volume 35. As a result and as is shown in FIG. 3, the liquid crystals which ordinarily in free form would tend to be parallel, although perhaps randomly distributed, are distorted to curve in a direction that generally is parallel to a relatively proximate portion of the interior wall surface 34. For simplicity of illustration, a layer 36 of liquid crystal molecules whose directional orientation is represented by respective dashed lines 37 is shown in closest proximity to the interior wall surface 34. The directional orientation of the liquid crystal molecules 37, more accurately the liquid crystal structure, is distorted to curve in the direction that is parallel to a proximate area of the wall surface 34. The directional pattern of the liquid crystal molecules away from the boundary layer 37 within the capsule is represented by 38. The liquid crystal molecules are directionally represented in layers, but it will be appreciated that the molecules themselves are not confined to such layers. Thus, the organization in an individual capsule is predetermined by the organization of the structure 37 at the wall and is fixed unless acted on by outside forces, e.g. an electric field. As is shown in FIG. 4, upon application of electric field E across encapsulated liquid crystal 30, the liquid crystal aligns with respect to the field. Preferably the liquid crystal 32 has positive dielectric anisotropy so that such alignment is in parallel with such field to achieve the optical results of reduced scattering since the ordinary index of refraction of the liquid crystal then is encountered by incident light and preferably is matched to the index of refraction of the capsule 33. On removal of the electric field the directional orientation of liquid crystal structure would revert back to the original one, such as that shown in FIG. 3.

Nematic type material usually assumes a parallel configuration and usually is optical polarization direction sensitive. However, since the material 32 in the encapsulated liquid crystal 30 is distorted or forced to curved form in the full three dimensions of the capsule 33, such nematic liquid crystal material in such capsule takes on an improved characteristic of being insensitive to the direction of optical polarization of incident light. The inventor has discovered, moreover, that when the liquid crystal material 32 in the capsule 33 has pleochroic dye dissolved therein, such dye, which ordinarily also would be expected to have optical polarization sensitivity, no longer is polarization sensitive because the dye tends to follow the same kind of curvature orientation or distortion as that of the individual liquid crystal molecules.

Although the foregoing discussion has been in terms of a homogeneous orientation of the liquid crystal material (parallel to the capsule wall), such is not a requisite of the invention. All that is required is that the interaction between the wall and the liquid crystal produce an orientation in the liquid crystal near that wall that is generally uniform and piecewise continuous, so that the spatial average orientation of the liquid crystal material over the capsule volume is strongly curved and there is no substantial parallel direction of orientation of the liquid crystal structure in the absence of an electric field. It is this strongly curved orientation that results in the scattering and polarization insensitivity in the field-off condition, which is a feature of this invention.

In the field-on condition, or any other condition which results in the liquid crystal being in ordered or parallel alignment, as is shown in FIG. 4, the encapsulated liquid crystal 30 will transmit substantially all the light incident thereon and will tend not to be visible in the containment medium or support medium. On the other hand, in the field-off condition when the liquid crystal is in distorted alignment, sometimes referred to herein as random alignment, for example as is shown in FIG. 3, some of the incident light will be absorbed, but also some of the incident light will tend to be scattered generally isotropically in the containment support medium 31. Using total internal reflection such isotropically scattered light can be redirected to the encapsulated liquid crystal 30 thus brightening the same tending to cause it to appear white to a viewer or viewing instrument.

As long as the ordinary index of refraction of the liquid crystal material is closer to the index of refraction of the so-called encapsulating or containment medium, than is the extraordinary index of refraction, a change in scattering will result when going from field-on to field-off conditions, and vice-versa. Maximum contrast results when the ordinary index of refraction matches the index of refraction of the medium. The closeness of the index matching will be dependent on the desired degree of contrast and transparency in the device, but the ordinary index of refraction of the crystal and the index of the medium will preferably differ by no more than 0.03, more preferably 0.01, especially 0.001. The tolerated difference will depend upon capsule size.

The capsules 33 may be of various sizes. The smaller the size, though, the higher the requirements will be for the electric field to effect alignment of the liquid crystal in the capsule. Preferably, though, the capsules should be of uniform size parameters so that the optical and electrical characteristics of the encapsulated liquid crystal will be substantially uniform. Moreover, the capsules 33 preferably are at least 1 micron in diameter so they appear as discrete capsules relative to an incident light beam; a smaller diameter may result in the light beam "seeing" the capsules as a continuous homogeneous layer and would not undergo the required isotropic scattering. Examples of capsule sizes, 0.3 to 100 microns or say from 1–30 microns diameter, and of liquid crystal material are in the above patents and application and are hereby specifically incorporated by reference.

One preferred liquid crystal material in accordance with the best mode of the invention is that nematic material NM-8250, an ester that has been sold by American Liquid Xtal Chemical Corp., Kent, Ohio, U.S.A. Other examples may be ester combinations, biphenyl and/or biphenyl combinations, and the like.

Several other types of liquid crystal material useful according to the invention include the following four examples, each being a recipe for the respective liquid crystal materials. The so-called 10% material has about 10% 4-cyano substituted materials; the 20% material has about 20% 4-cyano substituted materials, and so on.

| 10% Material | |
|---|---|
| Pentylphenylmethoxy Benzoate | 54 grams |
| Pentylphenylpentyloxy Benzoate | 36 grams |
| Cyanophenylpentyl Benzoate | 2.6 grams |
| Cyanophenylheptyl Benzoate | 3.9 grams |
| Cyanophenylpentyloxy Benzoate | 1.2 grams |
| Cyanophenylheptyloxy Benzoate | 1.1 grams |
| Cyanophenyloctyloxy Benzoate | 9.94 grams |
| Cyanophenylmethoxy Benzoate | 0.35 grams |
| 20% Material | |
| Pentylphenylmethoxy Benzoate | 48 grams |
| Pentylphenylpentyloxy Benzoate | 32 grams |
| Cyanophenylpentyl Benzoate | 5.17 grams |
| Cyanophenylheptyl Benzoate | 7.75 grams |
| Cyanophenylpentyloxy Benzoate | 2.35 grams |
| Cyanophenylheptyloxy Benzoate | 2.12 grams |
| Cyanophenyloctyloxy Benzoate | 1.88 grams |
| Cyanophenylmethoxy Benzoate | 0.705 grams |
| 40% Material | |
| Pentylphenylmethoxy Benzoate | 36 grams |
| Pentylphenylpentyloxy Benzoate | 24 grams |
| Cyanophenylpentyl Benzoate | 10.35 grams |
| Cyanophenylheptyl Benzoate | 15.52 grams |
| Cyanophenylpentyloxy Benzoate | 4.7 grams |
| Cyanophenylheptyloxy Benzoate | 4.23 grams |
| Cyanophenyloctyloxy Benzoate | 3.76 grams |
| Cyanophenylmethoxy Benzoate | 1.41 grams |
| 40% MOD | |
| Pentylphenylmethoxy Benzoate | 36 grams |
| Pentylphenylpentyloxy Benzoate | 24 grams |
| Cyanophenylpentyl Benzoate | 16 grams |
| Cyanophenylheptyl Benzoate | 24 grams |

The encapsulating or containment medium forming respective capsules 33 should be of a type that is substantially completely unaffected by and does not affect the liquid crystal material. Various resins and/or polymers may be used as the encapsulating medium. A preferred encapsulating medium is polyvinyl alcohol (PVA), which has a good, relatively high, dielectric constant and an index of refraction that is relatively closely matched to that of the preferred liquid crystal material. An example of preferred PVA is an about 84% hydrolized, molecular weight of at least about 1,000, resin. Use of a PVA of Monsanto Company identified as Gelvatol 20/30 represents the best mode of the invention. Other containment media are latex and epoxy. Examples of several containment media include carboxy polymethylene (e.g. Carbopole), various Gelvatol materials, Elvanol, and Poval.

A method for making emulsified or encapsulated liquid crystals 11 may include mixing together the containment or encapsulating medium, the liquid crystal material, and perhaps a carrier medium, such as water. Mixing may occur in a variety of mixer devices, such as a blender, a colloid mill, which is most preferred, or the like. What occurs during such mixing is the formation of an emulsion of the ingredients, which subsequently can be dried eliminating the carrier medium, such as water, and satisfactorily curing the encapsulating medium, such as the PVA. Although the capsule 33 of each thusly made encapsulated liquid crystal 30 may not be a perfect sphere, each capsule will be substantially spherical in configuration because a sphere is the lowest free energy state of the individual droplets, globules or capsules of the emulsion, both when originally formed and after drying and/or curing.

In accordance with the invention, other various types of support media 26 that may be used include Mylar, polyester materials and polycarbonate material, such as Kodel film. Tedlar film, which is very inert, also may be used if adequate adhesion of the electrode can be accomplished. Such media 26 preferably should be substantially optically transparent and should have an index of refraction the same as or closely matched to the index of refraction of the containment medium 31 so as not to contribute to further scattering or refracting of light.

Breifly referring to FIG. 5, there is shown an alternate embodiment of encapsulated liquid crystal material 30', which may be substituted for the various other embodiments of the invention disclosed herein. The encapsulated liquid crystal material 30' includes operationally nematic liquid crystal material 32' in a containment medium 31', e.g. in the form of a spherical capsule. In FIG. 5 the material 30' is in field-off condition, and in that condition the liquid crystal structure is oriented to be normal or substantially normal to the capsule wall at the interface therewith. Thus, at the interface the liquid crystal structure is generally oriented in a radial direction with respect to the geometry of the capsule or in any event less parallel to the capsule wall than the embodiment of FIG. 3. Moving closer toward the center of the capsule, the orientation of the structure of at least some of the liquid crystal molecules will tend to curve in order to fill, i.e. to utilize, the volume of the capsule with a substantially minimum free energy arrangement of the liquid crystal in the capsule, for example, as is seen in the drawing.

Such alignment is believed to occur due to the addition of an additive to the liquid crystal material 32' which reacts with the containment medium to form normally oriented steryl or alkyl groups at the inner capsule wall. More particularly, such additive may be a chrome steryl complex or Werner complex that reacts with PVA of the containment medium that forms the capsule wall to form a relatively rigid crust or wall with a steryl group or moeity tending to protrude radially into the liquid crystal material itself. Such protrusion tends to effect the noted radial or normal alignment of the liquid crystal structure. Moreover, such alignment of the liquid crystal material still complies with the above strongly curved distortion of the liquid crystal structure in field-off condition because the directional derivatives taken at right angles to the general molecular direction are nonzero.

The projector 1 of the invention preferably uses light that is transmitted through the liquid crystal material without refraction or that is forward scattered by the liquid crystal material.

Referring to FIGS. 2, 6, 7 and 8, in response to selective application of a charge creating a voltage or electric field at certain areas of the encapsulated liquid crystal layer 25, for example at areas 25A and 25B represented on the surface 4S and the non-application of electric field to other selected areas of the layer 25, for example at areas 25C and 25D represented on the surface 4S, alignment or not of that liquid crystal which is directly between such respective area on surface 4S and the electrode 27, or non-alignment (when no field is applied at a given area) can be achieved. Due to the effective capacitance of the encapsulated liquid crystal layer 25, when a charge is applied to a selected area, say at 25A, 25B, etc., such charge is stored and takes a finite time, for example several seconds or longer, to dissipate. For the duration of such stored charge, the electric field produced across the selected encapsulated liquid crystal material generally located between such area and the electrode 20 will cause the desired parallel alignment of the liquid crystal structure with respect to such field. Accordingly, by selecting particular areas of the encapsulated liquid crystal layer 25 at which electric field is to be applied, a representation of an image can be formed and stored by the encapsulated liquid crystal layer 25.

To complete the effective formation of an image by the imager 2 in response to such selective application of charge to various areas thereof, illumination is required. According to the preferred embodiment and best mode of the invention the source of illumination is provided by the projection optics 3. Such light source may illuminate the entire encapsulated liquid crystal layer 25 simultaneously for projection, as is described further below.

Effective formation of a viewable image capable of projection, for example, preferably is carried out in accordance with the disclosure in the above mentioned U.S. Pat. No. 4,606,611. At least a portion of the light scattered by such liquid crystal material also will scatter in a forward direction, e.g. toward the projector lens 6 and associated optics described further below. On the other hand, light, for example from the light source, which impinges onto that encapsulated liquid crystal material 30 in the layer 25 which is aligned with respect to an electric field will tend not to be scattered and, rather, will tend to pass directly through such liquid crystal material and the layer 25 also toward the lens 6 and associated optics. It will be appreciated that by selecting those areas, e.g. 25A-25D, and so on, where surface charge is or is not to be applied to the surface 4S in order to apply an electric field to selected encapsulated liquid crystal material in the layer 25, alphanumeric, graphical, pictorial, etc., images can be created, and those images can be projected.

The charge applicator 5 applies charge to the film 4 or otherwise causes parallel alignment of selected liquid crystal structure in the film. In the embodiment illustrated in FIGS. 2, 6 and 7, the charge applicator 5 includes, for example, an electronics portion 40, a drive motor 41 and a dynamic electrode 42. Responding to the information received from the computer/programmed drive 18 or other input system, the charge applicator 5 decodes such information and based thereon applies surface charge to selected areas of the surface 23 of the encapsulated liquid crystal layer 25. The drive motor 41 operates in response to control signals and/or power from the electronics portion 40 (possibly power may be provided from an external source, not shown). The dynamic electrode 42 is shown as a generally cylindrical scanning roller 43, which is seen in front elevation view in FIG. 6. Scanning here refers to relative movement occurring between the dynamic electrode 42 and the surface 4S to enable various locations on such surface in a sense to be addressed and to receive surface charge. Preferably the roller 43 is of electrically non-conductive material, and the roller has thereon a plurality of electrically conductive electrode strips 44. The electrode strips 44 are formed on or attached to the non-conductive exterior surface 45 of the roller and are electrically isolated from each other. The electrode strips 44 extend in annular fashion preferably completely circumferentially about the roller 43. The electrode strips 44 respectively are positioned in planes that are perpendicular to the axis 46 of the roller 43 so that as the roller rolls along the surface 4S preferably in a direction perpendicular to the roller axis and without slippage on the encapsulated liquid crystal layer 5, each rotating electrode strip 44 follows a straight line path along such surface 4S.

The roller 43 may be mounted so the axis thereof does not in fact move. Rather, the surfaces of the electrode strips roll along the surface 4S of the strip 4 as the latter is moved along its own continuous path by the motor 13 and drive roller 12. If desired the motors 13, 41 may be a single motor with appropriate drive connections to the roller 12 and electrode 42.

The electronics portion 40 cooperates with, monitors, and controls the motor 41, the position of the dynamic electrode 42 along the surface 4S, and the voltage applied (or not applied) to respective electrode strips 44. The electronics portion 40 also is connected to the electrode 27, which preferably is over the entire lower surface 4L of the encapsulated liquid crystal layer 25, e.g. using roller 17, and the potential of such electrode 27 is maintained, for example, at a relative ground potential so that voltage applied to an area of the surface 4S by an electrode strip 44 would be with respect to such ground or other reference potential. Appropriate wipers, brushes or other means may be used to connect the electrode 27 to the electronics 40 and/or to the rollers 15, 17.

In the electronics portion 40 the information from the input system 18, for example in the form of a serial input represented at 50, is converted to parallel information by a conventional serial to parallel decoder 51. The serial to parallel decoder 51 may be a conventional serial to parallel decoder, such as an integrated circuit device, for example a UART (universal asynchronous receive transmit device), or a plurality of the same, which produce parallel information on the parallel output lines 52 directly representative of the serial input information. Such parallel output lines 52 are respectively connected to the individual electrode strips 44 to apply any voltage on the respective output line to a respective electrode strip. If necessary various conventional logic circuitry may be used to decode the input data from the input system 18 to derive the parallel output data as the roller 43 rolls along the surface 4S. Accordingly, the respective electrode strips 44 apply such voltage(s) to the particular area(s) of the encapsulated liquid crystal layer 25 surface 4S with which such electrode strips 44 at that moment are engaged. Moreover, as the dynamic electrode 42 rolls along the surface 4S, such rolling movement is monitored and controlled by a synchronizing portion 53 of the electronics portion 50 e.g. relative to movement of the strip 4.

The synchronizing portion 53 in response to information from the serial input 50 synchronizes rolling movement of the dynamic electrode 42 and the signals produced on the serial to parallel decoder 51. In operation of the charge applicator 5, then, information, for example in the form of serial data, is received from the input system 18. That data is converted by the decoder 51 to parallel data supplied on the output lines 52 to respective electrode strip 44 when the dynamic electrode 42 is at a particular location on the surface 4S of the encapsulated liquid crystal layer 25; the foregoing is controlled according to the synchronization circuit 53 which operates the motor 41 that moves the dynamic electrode 42 and also preferably monitoring position of the dynamic electrode 42 relative to the strip 4. The synchronization circuit 53 continues to allow the motor 41 to move the dynamic electrode 42 along the surface 4S as additional information is received from the input system and the circuit 53 also continues to allow the decoder 51 to decode the new information and to provide appropriate alterations in the signals on the output line 52 which if necessary appropriately alter the voltage applied to respective electrode strips 44 depending on the nature of the input information. As the dynamic electrode 42 rolls along the surface 4S, then, the electrode strips 44 apply surface charge to selected areas, such as areas 25A, 25B. Such surface charge results in the application of an electric field between the respective area and the electrode 27 at the opposite surface 4L of the encapsulated liquid crystal layer 25 causing parallel alignment of the encapsulated liquid crystal material 30 therebetween. As was mentioned above, the encapsulated liquid crystal layer 25 has dielectric and resistive characteristics so as to be capable of storing such surface charges at the respective areas for a period of time that is adequate for the projection optics 3 to project the image effectively created in the encapsulated liquid crystal layer 25.

As is shown in FIG. 8, different surface charges can be applied to different surface areas of the surface 4S. For example, at areas 25A and 25B a positive charge has been deposited, and at areas 25C and 25D there is no charge. The deposited charge may be positive or negative. For example, at areas 25A' and 25B' negative charge is shown. Also, if desired, to expedite discharging an area of a given polarity, a charge of opposite polarity or a ground discharging connection made via the respective electrode strip passing over the respective area may be employed.

It will be appreciated that means other than the dynamic electrode 42 may be used to apply charge to the film 4. For example, other types of dynamic electrodes that are not cylinders with continuous electrode bands 43 may be used.

Figure 2A:
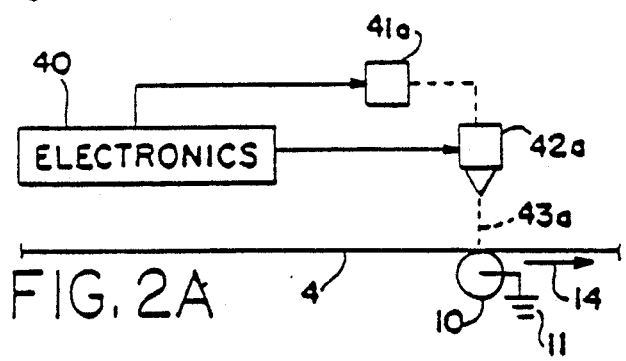
FIG. 2A is a fragmentary schematic view of a projector using a charge spraying device to apply charge to the liquid crystal film material.

Also, as is illustrated in FIG. 2A, an electric charge spraying device or source 42a may be used to spray charge 43a toward the surface 4S of film 4. Such charge spraying devices are conventional and may be used under control of the electronics 40 to determine where to spray charge 43a (and where not to spray charge). A motive mechanism 41a (such as a motor and a rotating support) may be used to move the device 42a to scan or to sweep the same and any sprayed charge across the surface of film 4 passing relative thereto, or plural spray devices 42a may be used to spray charge at respective location on the film 4, in either case the objective being accomplished to spray charge onto selected areas at any location on the entire surface of the film 4.

Figure 2B:
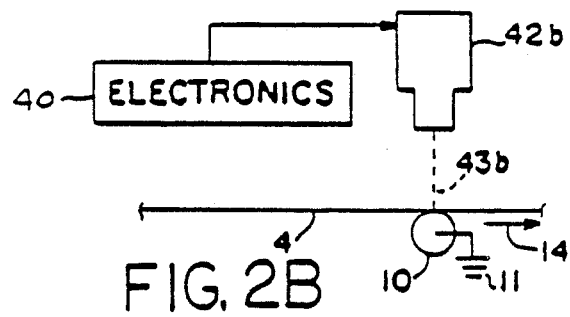
FIG. 2B is a fragmentary schematic view of another projector using a cathod beam stream of electrons to apply surface charge to the liquid crystal film.

As another example, in FIG. 2B is shown a beam of electrons directed toward and swept across the surface of film 4 to apply surface charge. Such electron beam may be generated by a cathode ray tube type device or the like indicated at 42b, while the film moves along its path 14. Thus, image characteristics for respective frames may be created by selectively applying charge to selected locations on the film 4 to cause parallel alignment of liquid crystal at such locations and not applying charge to other locations.

The Projector Apparatus

Turning, now, to FIG. 9, a liquid crystal projector according to the invention is designated 300. The projector 300 includes a housing 301 (analogous to housing 9, FIG. 1), an optics portion 302, including light input and light output portions 303, 304 (respectively analogous to the light source, preliminary, e.g. a condensing or collimating lens, and shutter 7 of FIG. 1), and a liquid crystal display 305 (analogous to the imager 2), all preferably located within, coupled to, or supported with respect to the housing 301, and an electric drive 306 (analogous to drive 18), which may be within, on, or external of the housing 301. The purpose of the projector 300 is to project an image or characteristics of an image formed by the liquid crystal display 305, while the same is driven by the electric drive 306, onto a projection screen or the like 307 (analogous to screen 8).

The liquid crystal display 305, which represents the part of the strip 4 immediately aligned in the projection optics 3 for projection of an image therein, is intended to selectively to affect (e.g. scatter) and not to affect (e.g. transmit) light incident thereon. For example, the liquid crystal display 305 would include a support medium and/or containment medium 310 having one or more layers of plural volumes of liquid crystal material 311 therein. The support/containment medium 310 preferably is formed as a strip of material having a dimension extending into the plane of the drawing of FIG. 9 with an edge 312 of such strip being seen in FIG. 9. The opposite surfaces 313, 314 of the display sheet preferably are optically transparent as opposed to being absorbent or reflective. Therefore, when an electric field is applied to a selected portion or area of liquid crystal contained in the display 305, whereby such liquid crystal material becomes effectively transparent, light incident on the display 305 will be transmitted therethrough without substantial scattering or absorption. However, light incident on those portions of the display 305 in which the volumes of liquid crystal material 311 are in the scattering mode described above, or in any event in the field-off, curvilinearly aligned or distorted structural orientation, will tend to be isotropically scattered, for example over 2 pi radians, as viewed in the planar drawing, or 4 pi steradians in three dimensions (spherical volumes), by such liquid crystal material in the manner described in greater detail above.

Dye, such as non-pleochroic dye, may be included in display 305 to color light to produce a colored output. Pleochroic dye may be included in the liquid crystal.

In optics 302 of projector 300, light input portion 303 includes light source 319, e.g. a conventional electric lamp or projector lamp, and collecting or collimating lens 320, and light output portion 304 includes projection lens 321 and light control device or light controller 322 to discriminate between light scattered by and transmitted through liquid crystal display 305. In one embodiment light control device 322a (FIG. 10) primarily is a mask 323, and in a second embodiment light control device 322b (FIG. 14) is an aperture 324. In either case, light control device 322 selects scattered or transmitted light for projection. Operation of several projector embodiments disclosed herein generally follows the lens formula $$\frac{1}{S_1} + \frac{1}{S_2} = \frac{1}{f}.$$

Although such formula applies to thin lenses, it will be apparent to those having ordinary skill in the art that similar properties and operational constraints will apply to thick lenses and to multiple lens systems, which are contemplated as included in the invention.

Light source 319 is located at a focal point of the collimating lens 320 so that such lens produces a collimated light output 325 directed at liquid crystal display 305. Collimated light 325 incident on portions of liquid crystal display 305 in field-on, optically transmissive condition, will be transmitted through display 305 and will continue as transmitted collimated light 326 to projection lens 321. The projection lens focuses such transmitted collimated light 326 at a focal point 327.

Collimated light 325 incident on liquid crystal material 311 in the field-off, curvilinearly aligned, distorted, etc., in any event generally isotropic scattering mode or structural alignment, will tend to be scattered. Such scattered light is represented at 328 in FIG. 9. Such scattered light 328 may or may not be received by lens 321. If received, such scattered light will tend to be projected by lens 321 toward light control device 322 but in general will not be focused at the focal point 327. Scattering of light by liquid crystal display 305 occurs primarily due to the difference between the index of refraction of support/containment medium 310 and the extra ordinary index of refraction of the liquid crystal material itself. (Optical transmission through display 305 without scattering is maximized when the ordinary index of refraction of the liquid crystal material and the index of refraction of the containment/support medium are matched as closely as possible—most preferably are equal.)

Although the volumes of liquid crystal material 311 may be arranged in one or more substantially continuous layers throughout liquid crystal display 305, such volumes of liquid crystal material also may be patterned, whereby discrete sections of liquid crystal display 305 would contain such volumes and other sections would not, thereby providing isolation for respective liquid crystal sections. Electric drive 306 may be a computer with approriate power output and/or control circuitry of conventional design capable of causing the charge applicator 5 to apply charge selectively, as was described above, to produce an electric field across the liquid crystal material 311.

Figure 10:
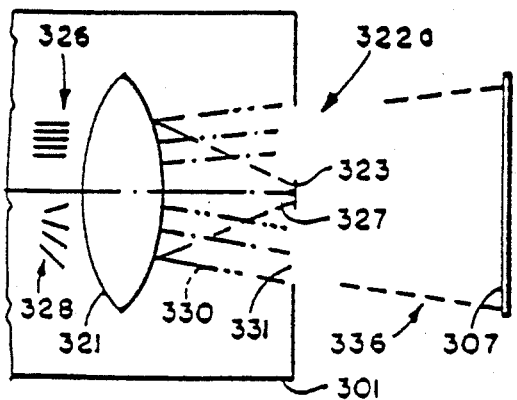
FIGS. 10 and 11 are fragmentary schematic illustrations of alternate light output mechanisms used in connection with the projection lens in the projector of FIG. 9.

Turning, now, particularly to FIG. 10, the light control device 322a includes a mask 323 located at the focal point 327 of the projection lens 321. The collimated light 326 received by the lens 321 is focused at the focal point 327 and simply is blocked by the mask 323. However, the lens 321 projects the scattered light 328 as light 330 out through a light output opening 331 in the projector 300 housing 301 to form the desired viewable image on the projection screen 307. To maximize the amount of scattered light collected, the lens 321 in this embodiment should be as large as is reasonably possible. Additional lenses, mirrors, filters, etc., as may be desired or required, may be employed to complete the function of projecting the light 330 passing out through the opening 331 to form the desired image on the screen 307. Using the projector 300 with the light control device 322a, then, those portions of the liquid crystal display 305 which are transmissive will appear black or dark on the screen 307 and those portions which are in scattering mode will appear relatively bright on the screen 307.

Figure 11:
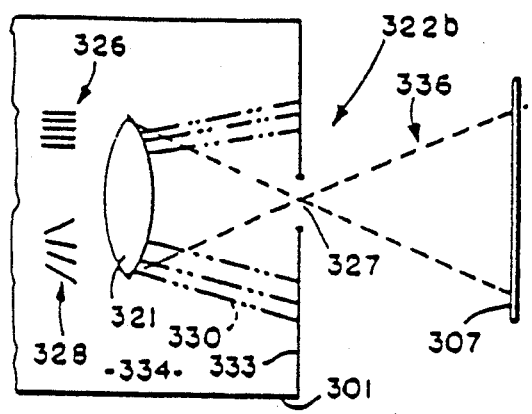

In FIG. 11, now, the light control device 322b includes an aperture 324. The projection lens 321 focuses the collimated light 326 at focal point 327, which is located in the aperture or at least in a position with respect to the aperture 324 so as to permit the passage of all or substantially all of the light focused thereat through the opening 332 for projection onto the screen 307. One or more additional lenses, mirrors or other optical devices may be employed to complete the function of projecting such light passing through the aperture 324 onto the screen 307. However, the scattered light 328 reaching the lens 321 is directed as light 330 onto walls 333 of the projector 300 housing 301 and/or walls bounding the aperture and, in any event, is blocked from being transmitted through the aperture opening 332. Preferably the mask 323 (FIG. 10) and the walls 333 are optically absorbent, for example including black paint, black felt, or other material to absorb light incident thereon, therefore preventing the reflection of spurious light back into the interior 334 of the projector housing. In fact, all of the interior walls of the projector housing 301 may be black or otherwise light absorbent to minimize spurious light therein.

In operation of the projector 300 employing the light control device 322b, then, those portions of the liquid crystal display 305, which are in the field-on, light transmitting mode, will appear bright on the screen 307; whereas those portions of the liquid crystal display 305 which are in the scattering mode will appear relatively dark on the screen 307. As was mentioned above, the lens formula $$\frac{1}{S_1} + \frac{1}{S_2} = \frac{1}{f}$$

generally applies. $S_1$ is the object distance, i.e. the distance of the display 305 from the lens 321; $S_2$ is the image distance, i.e. the distance of the screen 307 from the lens; and f is the focal length of the lens.

Various conventional support means (not shown) may be employed in the projector 300 as well as in the other projectors described below with respect to FIGS. 12A and 13, to support the various components of the projector in the housing 301 or in any event with respect to such housing or with respect to each other. Examples would be a socket for the lamp of the light source 319, lens holders for the lenses 320, 321, a support frame, such as a holder, or transparent substrate, such as a sheet of glass, plastic, Mylar film, etc. for the liquid crystal display 305, and so on. Appropriate electrical connections (not shown) also would be apparent to those having ordinary skill in the art, such as, for example, power connections to the light source 319 and electrical connections, represented at 335, between the electric drive 306 and the several electrodes of the liquid crystal display 305. Moreover, adjustability of the light output 336 from the projector 300 may be effected by appropriate adjustability of the size of the mask 323, of the opening 331, and/or of the opening 332 in the aperture 324.

Advantages of the projector embodiment of FIG. 10 in particular are the ability to use a display 305 that produces a relatively small amount of scattering in field off condition—therefore the display can be relatively thin; and the ability accurately to control with facility the so-called turn on characteristics of the display and projector using same.

Figure 12A:
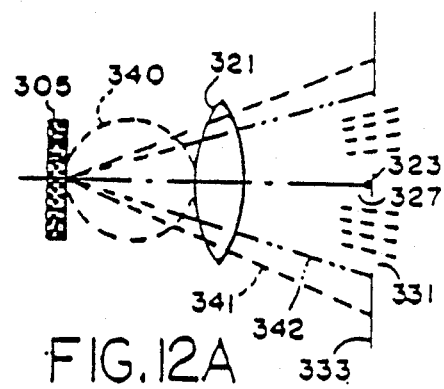
FIGS. 12A and 12B are, respectively, a schematic representation of light scattered by the liquid crystal display of FIG. 10 and a graph of intensity of projected light as a function of electrical input magnitude.
Figure 12B:
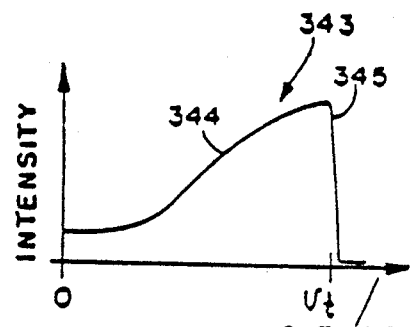

The illustrations in FIGS. 12A and 12B demonstrate such advantages of the projector 301 of FIG. 10. In FIG. 12A is a profile 340 showing how much light may be scattered in respective directions on one side of the display 305 when in field off condition. Much of the scattered light is transmitted through lens 321 and opening 331, but some scattered light is scattered away from the opening 331 and is blocked by the housing wall 333. As electric field is applied to the liquid crystal display 305, the cone of light 341 on the profile 340 will tend to collapse, e.g. as is shown at 341, and the amount of scattered light, i.e. intensity, exiting the opening 331 will increase. The general increase in intensity of projected light through opening 331 as a function of voltage or electric field magnitude is represented by curve 343 in FIG. 12B, particularly at the lefthand portion 344 of the curve. The change in intensity at curve portion 344 is relatively gradual, and in any event over the extent thereof light will be transmitted through the opening 331.

However, when adequate voltage $V_t$ is applied to liquid crystal in the display a very rapid transition occurs in the liquid crystal alignment, i.e. so as to become substantially transparent, whereupon the transmitted light therefrom is focused on the mask 323 and does not pass through opening 331. Such rapid transition is represented in FIG. 12B at curve portion 345 which has a much steeper slope than does curve portion 344.

Figure 13:
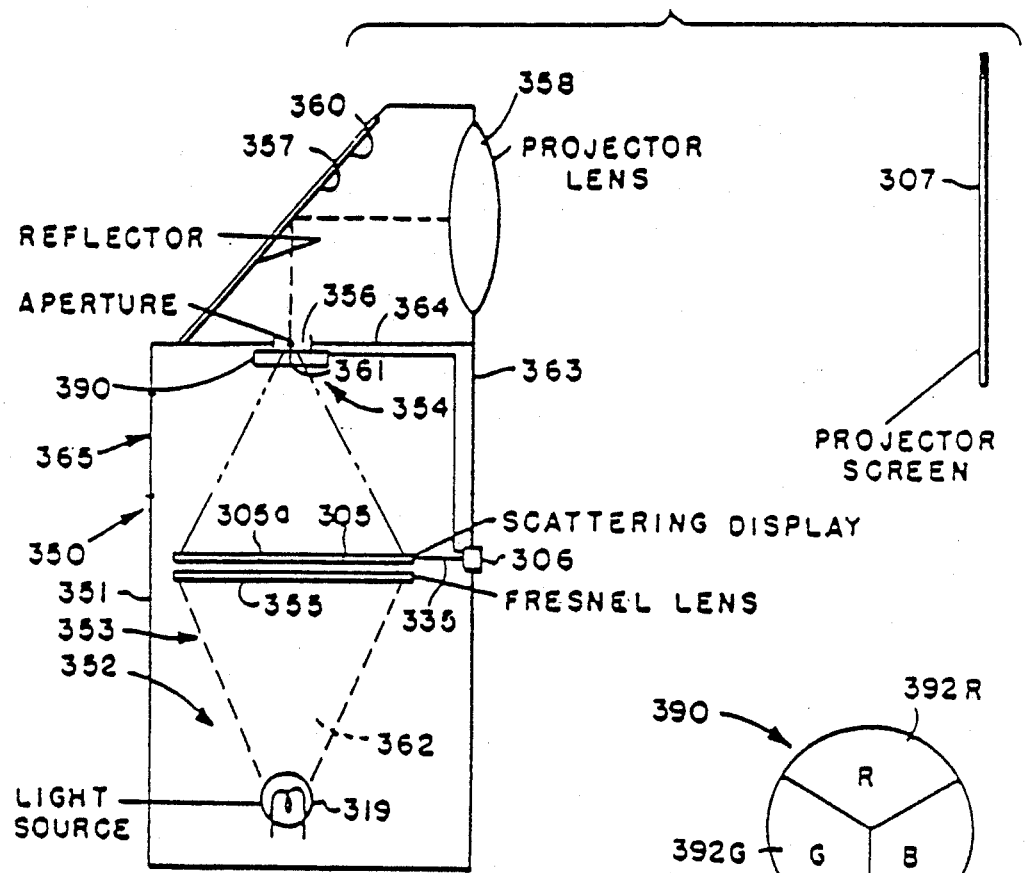
FIG. 13 is a schematic illustration of a folded liquid crystal projector in accordance with the preferred embodiment and best mode of the invention with a dynamic color filter.

Referring to FIG. 13, the preferred embodiment and best mode of the invention in the form of a liquid crystal projector 350 is shown. The projector 350 includes a modified housing 351 containing the projector optics 352, including a light input portion 353 and a light output portion 354. The light input portion 353 includes a light source 319 and a Fresnel lens 355, and the light output portion 354 includes an aperture 356, a reflector 357, and a projection lens 358. The reflector 357 and projection lens 358 are positioned in a housing or frame portion 360 optically downstream of the aperture 356, which is mounted in the housing 351. The reflector 357 is provided to fold the optical path of the liquid crystal projector 350 and thereby to reduce the size and/or general structural configuration of the projector relative to, for example, the straight through projector 300 shown in FIG. 9.

The light source 319 is located at one principal point or focus of the Fresnel lens 355, and the aperture 356 is located at the opposite principal point or focus 361 of the Fresnel lens 355. Therefore, in the absence of any optical disturbance, light from the source 319 traveling along the optical path 362 and received by the Fresnel lens 355 will be focused at the focal point 361 in the aperture or proximate the aperture 356. Moreover, the light transmitted through the aperture 356 will be reflected by the reflector 357 toward the projection lens 358 and will be projected by the latter onto the screen 307, for example to form an image thereon.

The display 305, i.e. that part of strip 4 then being in line to be projected, e.g. a given frame area of the strip 4, is mounted preferably in parallel and in proximity to the Fresnel lens 355 and also is mounted in the object plane of the lens 321, i.e. a distance $S_1$ from the lens according to the above formula requirements. Preferably the effect of the index of refraction of the display 305 will not detrimentally affect the light focused by the Fresnel lens 355 at the aperture 356 unless liquid crystal in the display is in the scattering mode.

In operation of the liquid crystal projector 350, then, the electric drive 306 operating through the interconnection 335 to the liquid crystal display 305 applies an electric field, for example, to selected portions of the display and does not apply an electric field to other portions. Those portions in which the field is applied will be optically transmissive, and the other portions will operate in a scattering mode, as aforesaid. The light transmitted through the display 305 will be focused at the focal point 361 of the Fresnel lens 355 in the aperture 356. Such light, moreover, will be reflected by the reflector 357 and projected by the lens 358 onto the screen 307 to form bright areas of an image thereon. On the other hand, those portions of the liquid crystal display 305 which tend to scatter light, will scatter such light generally isotropically preferably over 4 pi steradians and, in any event, substantially most of such light will be scattered away from or so as not to pass through the aperture 356 and instead will be absorbed by the walls or material associated with, lining, etc. the housing 351.

The preferred projector 350 of the invention preferably has color capability. Thus, there is located at the aperture 356 a color filter type device 390, which may be operatively controlled by the electric drive 306 connected by connection 335a to color or not light transmitted through the liquid crystal display 305 and focused by the Fresnel lens 355 onto the aperture 356.

Figure 14:
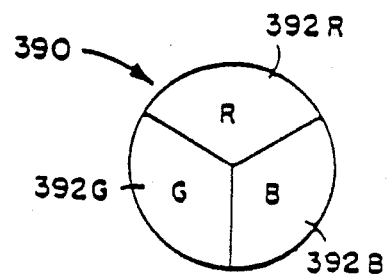
FIG. 14 is a plan view of the dynamic color filter.

The color filter type device 390 is shown in plan view in FIG. 14 having respective red, green and blue pie-shape sectors 392R, 392G, 392B. Each sector preferably is comprised of liquid crystal display material the same as or similar to that used for the liquid crystal display 355; however, each individual sector of the filter 390 is dyed a respective color. More specifically, the filter 390 may be formed of operationally nematic liquid crystal material contained in plural volumes formed in a containment medium. Non-pleochroic dye preferably is provided, for example by imbibition or otherwise, in the liquid crystal material and/or containment medium in the respective colored sectors. Electrodes positioned on opposite sides of the filter 390 may be energized selectively by the electric drive 306 to apply an electric potential across any one or more of the sectors causing the same to become generally optically transparent, but nevertheless capable of tinting or coloring light transmitted therethrough. In operation, then, if the red sector 392R has an electric field applied across it to make the same relatively transparent, while the green and blue sectors 392G, 392B were not energized, light transmitted through the aperture 356 and projected by the lens 358 would be tinted or colored red. Similar operation could occur by exclusively energizing one of the green or blue sectors 392G, 392B to effect green or blue coloring of the projected light. Additive coloring could occur, too, by energizing two or three of the sectors in the filter 390. As to those segments 392 which are not energized and optically transmissive, the same will tend to scatter light which primarily will not be collected by the lens 358 for projection onto the screen 307; although some of such scattered light may be collected and transmitted, nevertheless the amount of that light would be relatively small compared to that transmitted through the energized sector and, accordingly, would have minimal effect on the color projected onto the screen 307.

Also, if desired, an additional undyed sector may be included in the filter 390 to facilitate transmitting white light to the lens 358 for projection onto the screen 307. It will be appreciated that the electric drive 306 may change selectively the portions or pixels of the liquid crystal display 305 and can coordinate the same with selected operation of the filter 390 thereby to produce single color or multicolored images, either still or moving, for projection by the lens 358 onto the screen 307.

It will be appreciated that the projector 350 provides control of the optical characteristics of an image projected onto a relatively large screen by using a relatively small size light control shutter which preferably has one or more different color sectors or segments. Thus, a relatively large area of output light, i.e. the image projected onto the screen 307, can be chopped or controlled by a relatively small area shutter 390, and using only three different colored sector portions 392 of the filter 390, more than three color outputs can be obtained.

Figure 15:
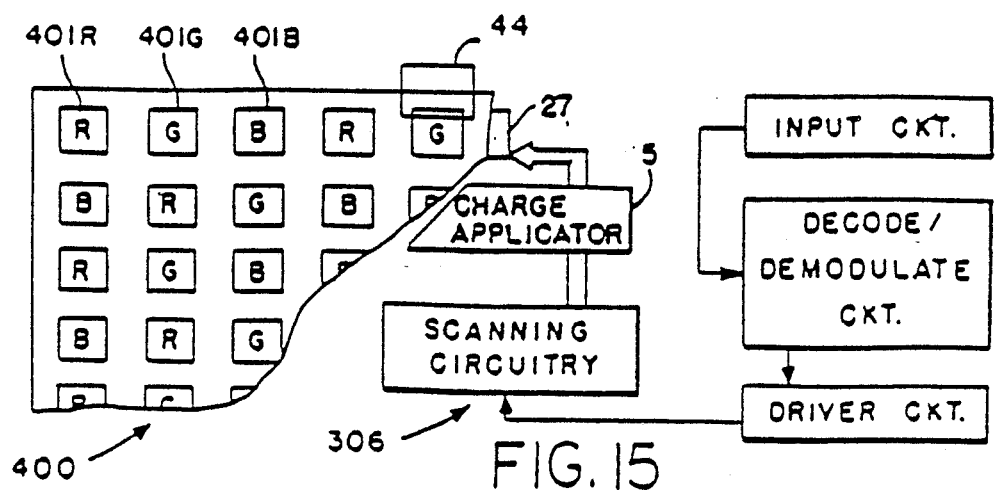
FIG. 15 is a dyed display for use in the projectors.

Briefly referring to FIG. 15, a liquid crystal display 400 for use with the several projectors of the invention is shown in conjunction with an electric drive 306. The display 400 has dye 401 therein. Such dye is represented schematically. However, it will be appreciated that such dye 401 may be pleochroic dye in the liquid crystal to reduce transmission and scattering in the field-off condition; may be a non-pleochroic one color dye in the liquid crystal or in the contact/support medium to color light; or may be several non-pleochroic dyes of several different colors located in different portions of the display to provide a multicolor output tending to effect a tinting or coloring form of light projected by the projector using such display 400.

Using the circuitry illustrated in FIG. 15 in cooperation with the charge applicator 5, for example, then, various pixel-like areas, such as those identified 401R, 401G, 401B in the display 400 selectively can be addressed to apply or not to apply charge and, thus, an electric field thereacross. Depending on which pixels are energized and which are not, light transmitted through the display 400 may be colored so that the resulting output of light projected by a projector using such display 400 will provide a color output. Moreover, if the pixels in the display 400 are adequately small, the same may in effect be additive in the coloring effect on the projected light. Accordingly, various colors may be produced by having more than one of such pixels energized or not at any given time. Such additive coloring may be considered analogous to that which occurs in a conventional color television in which selected color dots or pixels are selectively energized, and ordinarily only three different colors are required to produce virtually any color output, as is known in this color optics field.

Figure 16:
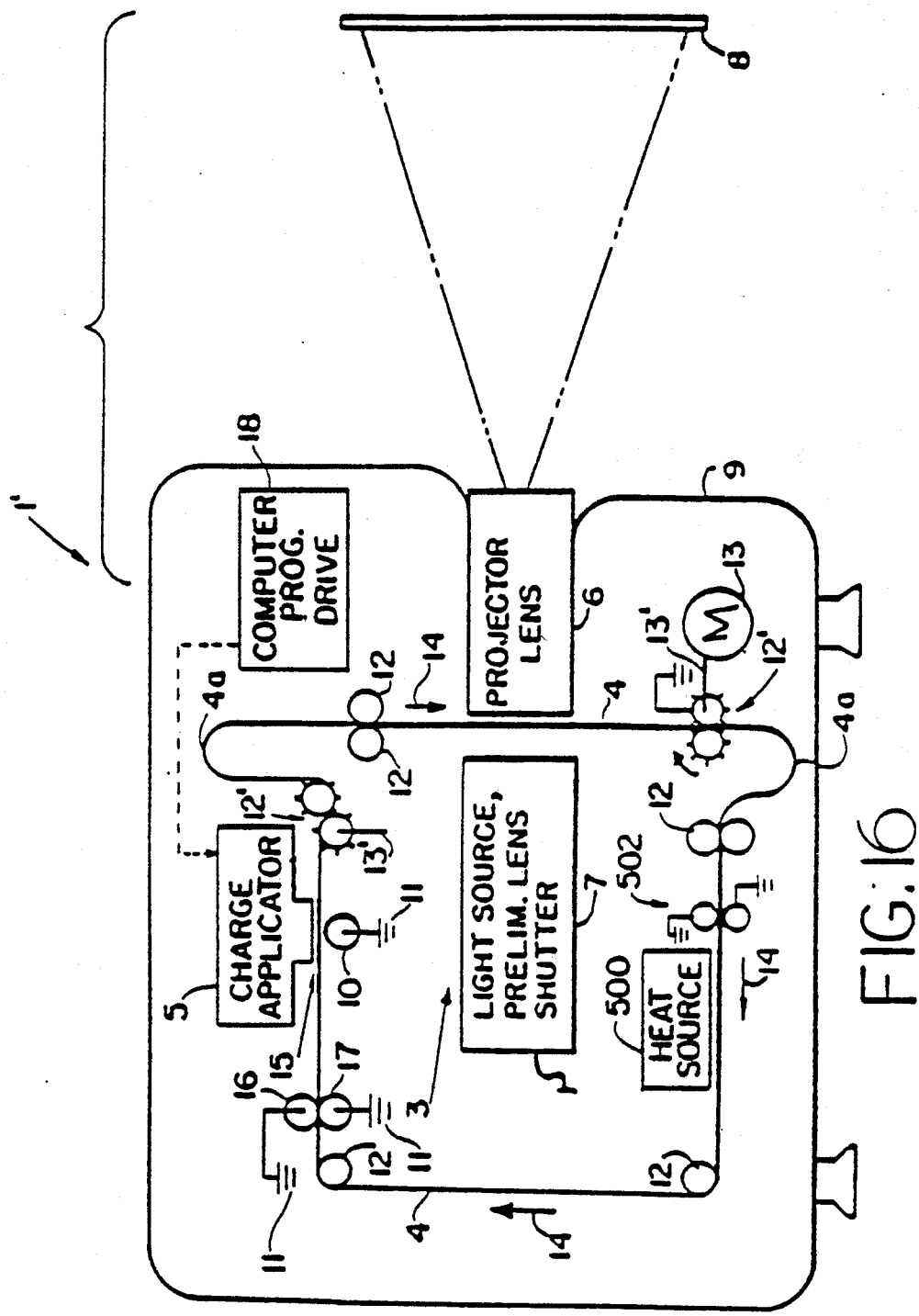
FIG. 16 is a projector for use with smectic liquid crystal in which charge or electric field is used to write an image and heat is used to erase an image from the "film"

Reference is made to FIG. 16 in which a modified projector 1' is illustrated. Such projector 1' is substantially the same in construction and operation as the projector 1, except the projector 1' is particularly useful when employing smectic or operationally smectic liquid crystal material substituted for the nematic liquid crystal 32 in the volumes 33 within containment medium 31. Ordinarily the smectic liquid crystal structure will align with respect to electric field resulting from deposited charge on surface 4S by the charge applicator 5 to achieve transmission of light without scattering at those areas of the smectic liquid crystal strip (strip 4 with smectic material) where such charge exists. However, erasing of a given image by discharging the strip ordinarily would be relatively ineffective because smectic liquid crystal ordinarily is not reversible. Therefore, a heat source 500 is provided relatively downstream of the projection optics to effect such erasing of image characteristics on the strip. If necessary, a further discharge roller or rollers 502 may be used to discharge the strip before such heating of the same.

Such heat source 500 adequately heats the smectic liquid crystal above the smectic nematic transition temperature or to a temperature above the isotropic temperature of the liquid crystal material. As a result, the liquid crystal in the volumes 33 again will have a distorted structure that will, as in the above described projector 1 with the nematic liquid crystal, scatter light and will be ready to align with respect to electric field if a charge is applied again, e.g. by the charge applicator. Thus, it will be appreciated that several projector embodiments described above may employ smectic liquid crystal.

Referring more particularly to operation to distort the smectic liquid crystal structure after such structure has been aligned with respect to an electric field, the heat source 500 may heat part or all of the strip 4 as the strip passes by the heat source. If the heat source heats the strip to a temperature exceeding the smectic nematic transition temperature, such that while above such temperature the smectic liquid crystal material behaves as nematic liquid crystal material, then while above such temperature the structure thereof will undergo distortion of the structure thereof to curvilinear alignment as is depicted in FIGS. 3 and 5 and is described above.

Above the isotropic temperature of the smectic liquid crystal material, such material loses at least some of the properties of liquid crystal, such as those of structure. However, upon cooling from a temperature above such isotropic temperature to a temperature below such isotropic temperature the material will regain such structural properties. If such cooling occurs while the liquid crystal material is within the confines of a containment medium that contains the material and has a wall surface capable of imparting the above-described structural distortion to the liquid crystal, then upon such cooling the liquid crystal material will regain the structural characteristics, and the liquid crystal structure will be distorted, e.g., in the manner described above and illustrated in FIGS. 3 and 5.

The time during which the liquid crystal material must be at elevated temperature or the time it takes to effect adequate heating of the liquid crystal material to achieve elevated temperature to obtain the desired curvilinear alignment may be a function of the sizes of the volumes of the liquid crystal material, the chemical composition of the liquid crystal material, and perhaps other factors. However, the heat source may be of a size such that it provides adequate heat for such purposes essentially regardless of the speed of the strip 4. Thus, heat may be applied to the strip for a long or a short time, depending on the requirements to effect the distorted alignment or erasing of the liquid crystal material thereof. Similarly, the time required for the liquid crystal material adequately to cool to have distorted structure before being subjected to electric field at the charge applicator 5 may be adjusted simply by changing the distance and, thus, the length of the strip 4, between the heat source 500 and the charge applicator.

Therefore it will be appreciated in this embodiment and in the several other embodiments of the invention the time of heating to erase or to write and the time to apply charge and/or to discharte the film 4 or other imager device may be different from the time that a frame is in the projection optics 3. Such speed or time difference may be achieved by altering the size of the source of heat, charte, etc., by altering the size, shape and/or path of the film 4, and/or by providing mechanism to effect some degree of co-directional movement of the film 4 and the source of heat, charage, etc.

In the liquid crystal projector 1' of FIG. 16 preferably the heat source 500 is used to erase the liquid crystal material of the strip 4 as such strip passes by the heat source. The charge applicator 5 then selectively applies charge to the strip 4 to create image characteristics therein. Alternatively, the heat source 500 may selectively heat only portions of the strip 4 to cooperate with the charge applicator to create such image characteristics.

Figure 17:
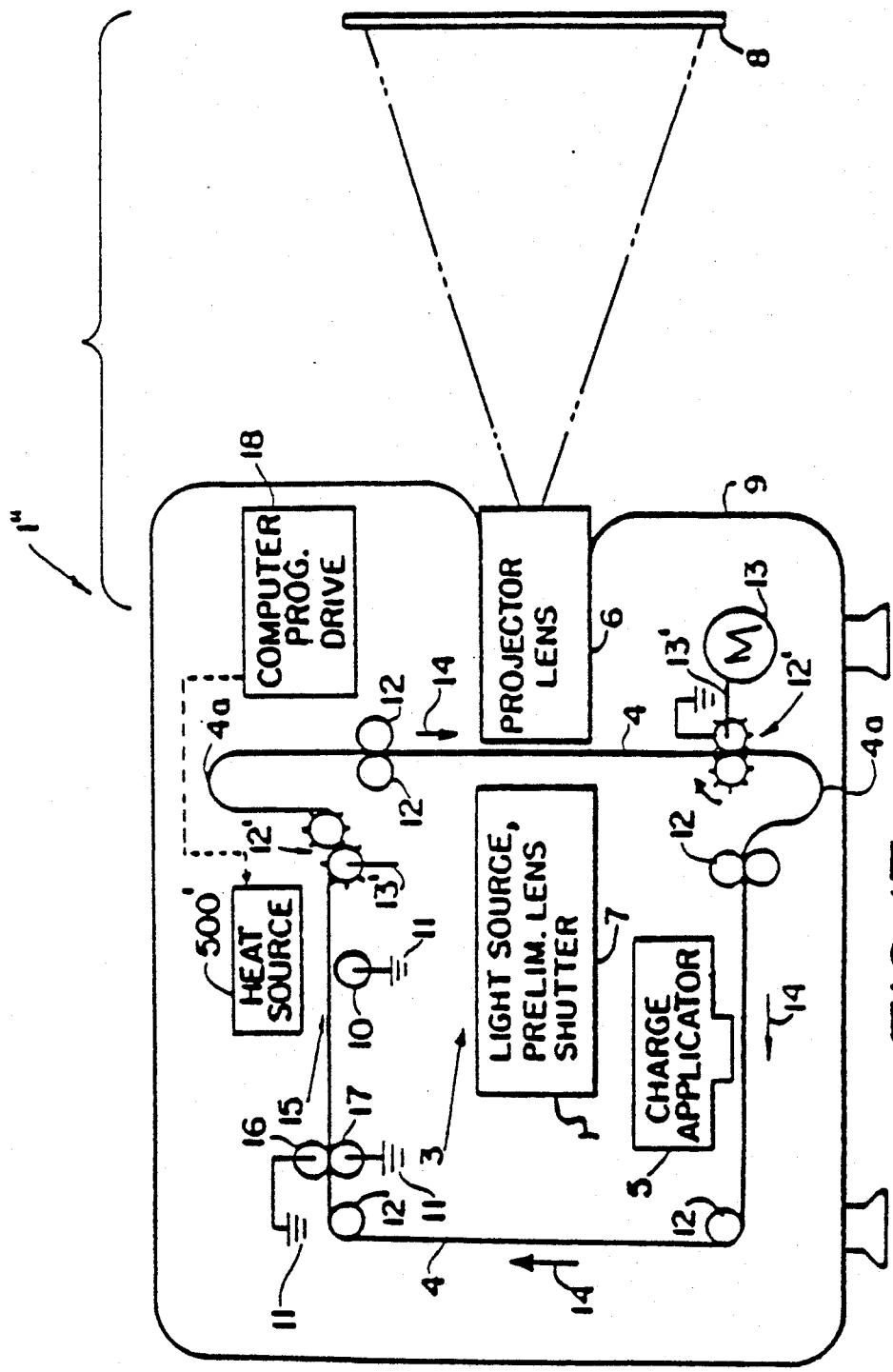
FIG. 17 is another projector similar to that of FIG. 16 for use with smectic liquid crystal in which the heat is used to write an image and charge or electric field is used to erase the image from the "film"

Another embodiment of liquid crystal projector 1'' that uses smectic liquid crystal material is illustrated in FIG. 17. In the projector 1'' the positions of the charge applicator 5 and the heat source 500' relative to the travel direction of the strip 4 are reversed from the relation shown in the projector 1' of FIG. 16. In such embodiment the charge applicator 5 may be used to apply charge across the entire width of the strip 4 as the strip passes by the charge applicator to align the liquid crystal structure in parallel. The heat source 500' downstream of the charge applicator may be used under control of the computer program drive 18 selectively to heat only those portions of the liquid crystal strip 4 intended to scatter light due to distorted structural alignment thereof. Adequate time for heating and cooling of the liquid crystal material passing the heat source 500' is provided in the manner mentioned below, e.g., according to the length of the heat source 500' and/or of the distance from the heat source 500' to the projection optics.

The heat source 500' may be a laser device, for example, of the type used in laser printers. Such a laser device includes a beam of laser radiation/light of small cross section. The beam rapidly is directed at the surface of the strip 4 as it is rapidly swept to scan across that surface, for example, using a rapidly rotating multi-sided mirror. A modulator modulates the beam to determine whether or not it is to apply radiation to respective "dot-like" areas of the strip 4 as it is swept across the surface. When radiation is so applied to an area of the strip 4, such radiation is adequate to effect the desired heating of the liquid crystal material at such area to cause the liquid crystal material to achieve the distorted alignment described above. Other types of heat sources capable of selectively applying thermal energy to respective areas of the strip alternatively may be used.

In the manner just described, then, it will be appreciated that the charge applicator 5 effectively erases the strip and the heat source 500' selectively writes information to the strip to create the characteristics of an image for projection in the manner described above. It also will be appreciated that the heat source and the charge applicator may be used to cooperate with each other to write information to selected parts of the strip without erasing all of the strip or writing to all, i.e., fully across, the strip.

Figure 18:
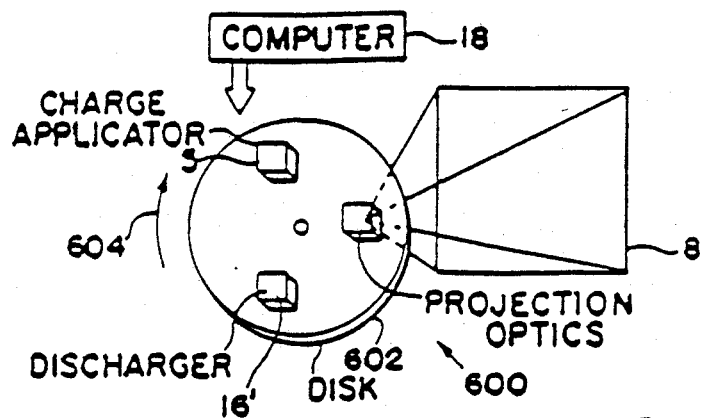
FIG. 18 is a schematic view of a projector that uses a liquid crystal image storage medium in the form of a disk on which charge may be stored to retain the image.

Turning, now, to FIG. 18, a modified projector 600 according to the invention is illustrated. The projector 600 is similar to the projectors 1, 1' and 1" described above. However, in the projector 600 the liquid crystal member intended to have image characteristics stored therein for projection is in the form of a rotating disk 602 substituted for the endless strip 4. The disk 602 may be a flat generally transparent disk of material similar to that used in the strip 4 described in detail above. The disk 602 contains encapsulated liquid crystal material, for example, operationally nematic material which is adequately supported, e.g., by a support medium, that has adequate strength to maintain relatively rigid characteristics for accurate writing and projecting functions. Exemplary material may be a clear polymer or plastic material that has optical characteristics which do not interfere with operation of the liquid crystal material. The encapsulated liquid crystal material operates to transmit or to scatter light depending on structral alignment of liquid crystal material at respective locations therein so as to have created in the disk frames of information or image characteristics that can be projected as above.

In the projector 600, then, a charge applicator 5 may apply electrical charge to the surface of respective parts of the disk 602 to create information or image characteristics for projection. A computer drive 18 may be used to determine which portions of the disk are to receive electrical charge from the charge applicator 5 to create an image for projection. As respective frames are brought into alignment with the projection optics, such information or image is projected to the screen 8. After a frame has been projected, the discharger 16' discharges the area of the disk where the frame had been located, and such area then is ready to be written to again by the charge applicator. The discharger 16' may be one or more wipers, rollers (e.g., like the discharge rollers 16, 17 of FIG. 1), or other means capable of discharging any residual charge remaining on the disk after projection.

Operation of the projector 600 is generally similar to the operation of the projectors 1, 1' and 1" described above. As the disk 602 rotates in the direction of arrow 604, information or images are written at respective areas thereof termed "frames". The frames sequentially are rotated into alignment with the projection optics 3 for projection thereby. A shutter associated with the projection optics may open and close sequentially so as to present to the screen a series of sequential images that can be reconstructed or integrated by an observer in the same way that conventional motion pictures are so reconstructed or integrated. After a frame has been projected, it can be erased by the discharger and the area generally where the frame had been located can be subsequently re-written with another image by the charge applicator, and so on.

Figure 19:
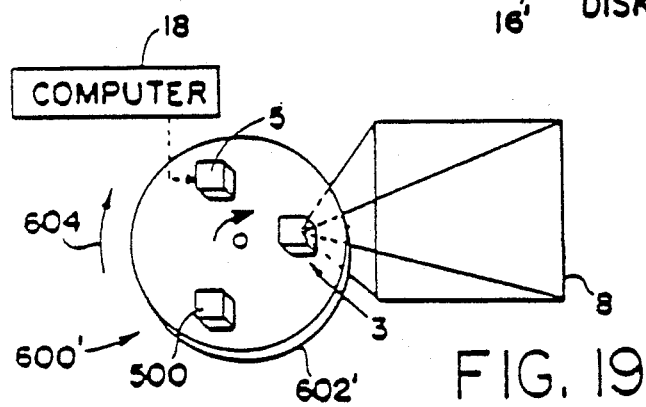
FIGS. 19 and 20 are schematic views of projectors similar to those of FIGS. 16 and 17, but here using a disk type smectic liquid crystal storage medium.
Figure 20:
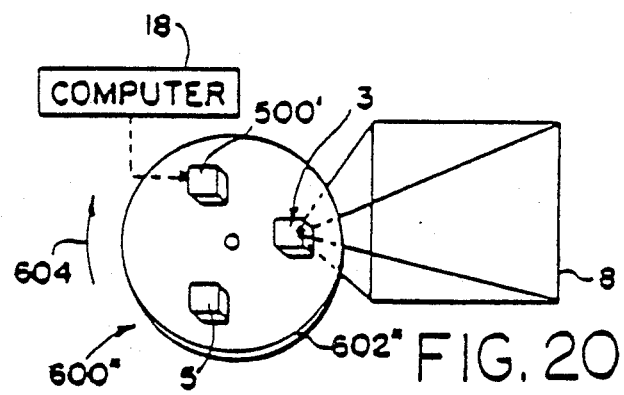

Briefly referring to FIGS. 19 and 20, liquid crystal projectors 600' and 600" are shown schematically. Such projectors 600' and 600" are similar to the projector 600 described above with respect to FIG. 18 in that they all use a liquid crystal disk on which to form information or image characteristics for projection. However, the disks 602' and 602" of the projectors 600', 600", respectively, use operationally smectic liquid crystal material and, accordingly, are similar in operation to the projectors 1', 1" described in detail above with respect to FIGS. 16 and 17.

Thus, the projector 600' includes projection optics 3, a charge applicator 5 to write information to the disk 602' and a heat source 500 to erase such information after projection thereof. In the projector 600" the heat source 500' (e.g., of the laser type) writes information to the disk 602" for projection by the projection optics 3, and the charge applicator 5 erases the information after projection. A computer program drive 18 may be used in the projectors 600' and 600" to determine where charge or heat is to be applied to the respective disk 602', 602" for writing information thereto, as was described above.

Figure 21:
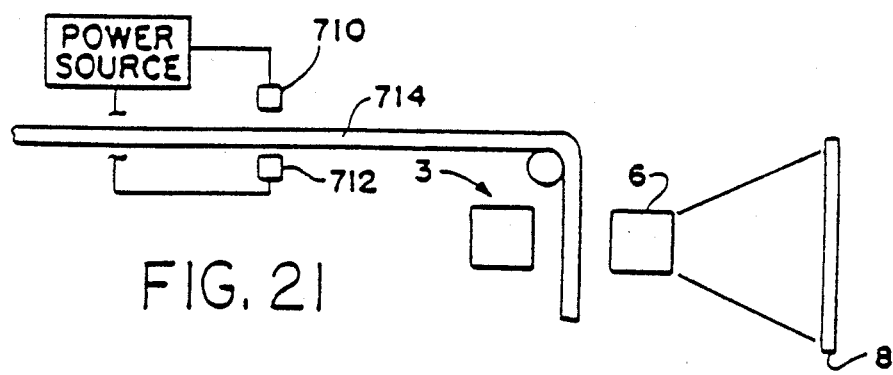
FIG. 21 is a schematic view of a further smectic liquid crystal projector that uses a pair of electrodes detached from the liquid crystal storage medium for applying electric field selectively to align the structure of selected liquid crystal.
Figure 1:
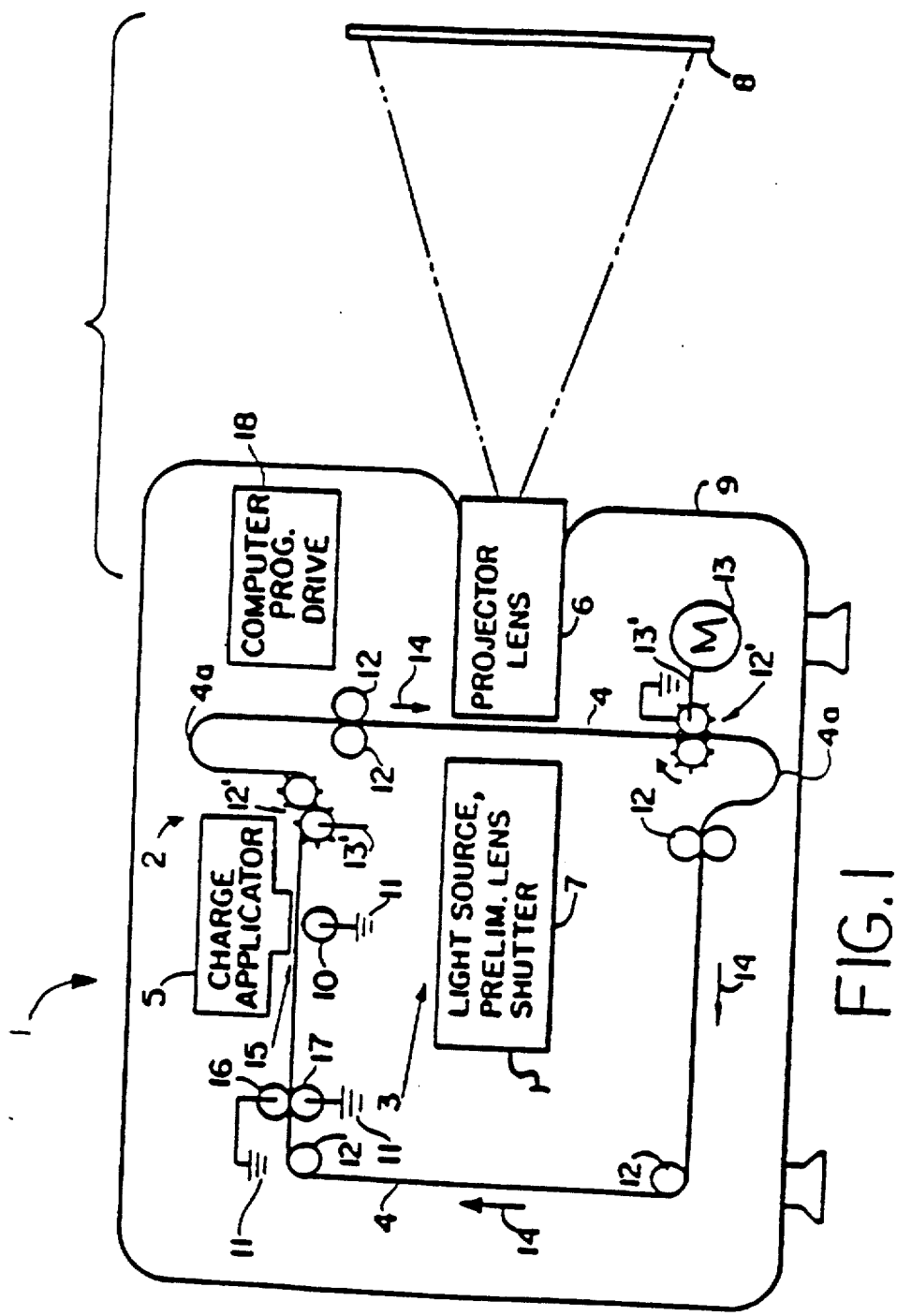
Figure 10:
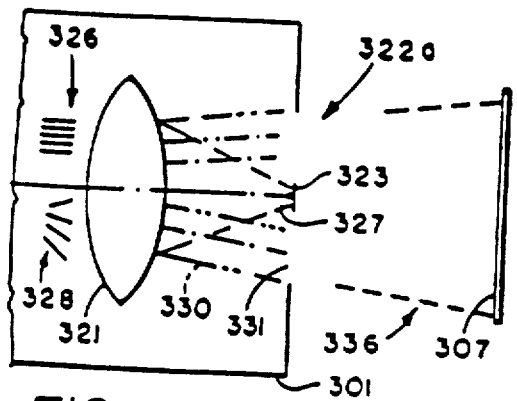
Figure 11:
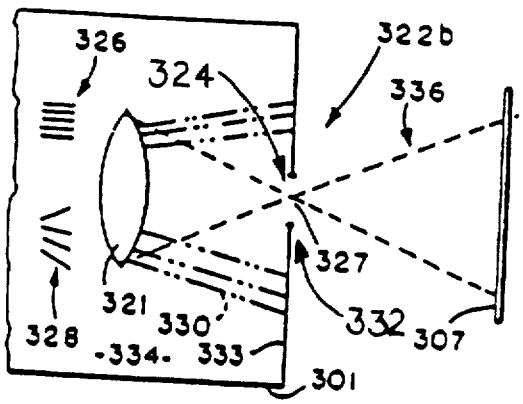
Figure 12A:
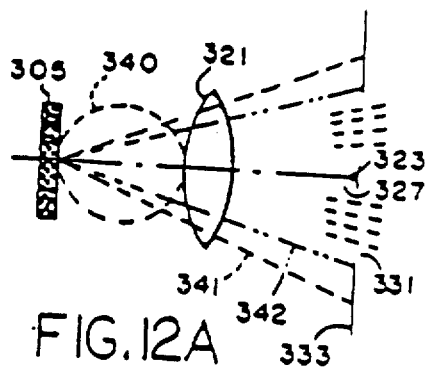
Figure 12B:
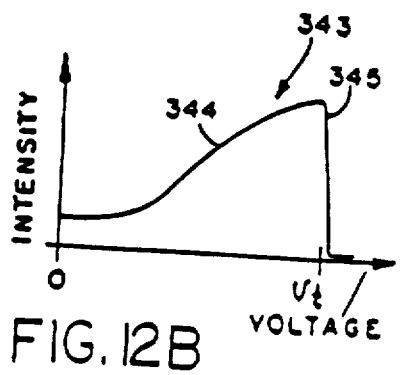

Turning to FIG. 21, a further modified liquid crystal projector 700 is illustrated schematically. The projector 700 uses operationally smectic liquid crystal material and, therefore, is similar to the smectic material projectors described above. Importantly, the projector 700 does not apply electrical charge directly to the surface of the smectic liquid crystal film medium 714, such as strip 4 (or equivalently one of the disks 602') to achieve parallel alignment of liquid crystal structure for optical transmission with no scattering or minimum scattering. Rather, a separate pair of electrodes 710, 712 are provided to apply electric field to the encapsulated operationally smectic liquid crystal material as it is moved past the electrodes; and such electric field causes the desired parallel alignment of liquid crystal structure. Due to the memory capability of the smectic liquid crystal material, the parallel aligned smectic liquid crystal structure remains so aligned until subsequently caused to be in distorted alignment in response to heat input as was described above. Advantageously the smectic film 714 does not have to carry its own electrode to hold the surface charge or to undergo and to maintain parallel structureal alignment of the smectic liquid crystal material. This is due to the bulk structural storage capability of the encapsulated smectic liquid crystal material, as was described below.

The various principles disclosed with respect to a particular embodiment of liquid crystal projector described herein may be used with one or more of the other embodiments hereof in accordance with the spirit and scope of the invention. Various equivalent parts and methods of operation may be employed within the spirit and scope of the invention.

It will be appreciated that the invention embodies several methods with which various disclosed and other apparatus may be used. Summarizing, an image is applied to and is stored by liquid crystal material in one part of a liquid crystal member. Relative movement or effective movement occurs between projection optics and such one part of the liquid crystal member so that such optics can be used to project the image. A further image can be applied to and stored by another part of the liquid crystal member for subsequent projection by the projection optics. Such further image may be applied to the other part of the liquid crystal member while the first image is being projected; and the speed with which an image is applied to the liquid crystal member or is erased therefrom may be different than the relative projection speed, i.e., the time period measured from the commencing of projecting of one image until the commencing of projecting of the next image by the projection optics. The liquid crystal member serves as a transfer medium to receive and to store images and to convey the images into the projection optics for projection or to store the images as the projection optics effectively moves relative to the liquid crystal member so as to project sequentially the images contained therein.

STATEMENT OF INDUSTRIAL APPLICATION

The invention may be used, inter alia, to project a light image of characteristics created in a liquid crystal optical display.

I claim:

1. A liquid crystal moving picture projector comprising
   a liquid crystal imager means for creating characteristics of an image, and
   projection optics means for projecting images sequentially created by the imager,
   said imager means including a liquid crystal material capable of temporarily storing information at respective areas thereof to create image characteristics capable of being projected sequentially by said projection optics means.

2. The projector of claim 1, said liquid crystal material comprising a continuous strip of liquid crystal in a containment medium.

3. The projector of claim 2, further comprising means for effecting relative movement between said strip and said projection optics means thereby sequentially to bring respective information to said projection optics for projection thereby.

4. The projector of claim 1, said liquid crystal material being capable of temporarily storing electrical charge to create characteristics of an image.

5. The projector of claim 4, said liquid crystal material comprising operationally nematic liquid crystal.

6. The projector of claim 1, said liquid crystal material comprising operationally smectic liquid crystal.

7. The projector of claim 6, further comprising electrical means for applying electric field to said liquid crystal to effect alignment of liquid crystal structure relative to such electric field to maximize transmission of light through such liquid crystal material while substantially minimizing refraction of light.

8. The projector of claim 6, further comprising containment medium means for containing said liquid crystal in plural volumes, said containment medium means including surface means for distorting the structure of said liquid crystal.

9. The projector of claim 8, further comprising means for applying thermal energy to said liquid crystal material to cause the same to undergo distorted structural alignment to tend to refract light incident on such liquid crystal and containment medium means.

10. The projector of claim 9, further comprising electrical means for applying electric field to said liquid crystal to effect alignment of liquid crystal structure relative to such electric field to maximize transmission of light through such liquid crystal material while substantially minimizing refraction of light.

11. The projector of claim 1, wherein said liquid crystal material comprises liquid crystal material in a containment medium that tends to distort the structure of the liquid crystal to cause scattering or absorption of incident light, said liquid crystal being responsive to application of an electric field to align with respect thereto to reduce such scattering or absorption.

12. The projector of claim 11, wherein said liquid crystal material has a memory characteristic whereby after the structure thereof has been aligned with respect to an electric field such alignment is maintained even after removal of such field until a further prescribed input is provided the liquid crystal material.

13. The projector of claim 12, wherein such further prescribed input is thermal energy.

14. The projector of claim 1, further comprising input means for at least one of writing or erasing information with respect to said liquid crystal material for projection by said projection optics means.

15. The projector of claim 1, said imager means including surface means for storing charge thereon to create an electric field that tends to align liquid crystal material therein, whereby such stored charge and liquid crystal alignment in response thereto provides the temporary storage function of said liquid crystal material.

16. The projector of claim 15, said imager means including electrode means for providing a source of reference potential relative to such charge to effect the application of electric field.

17. The projector of claim 15, said imager means comprising operationally nematic liquid crystal material in a containment medium that tends to distort the natural structure of the liquid crystal in the absence of an electric field to cause scattering or absorption of incident light, and said liquid crystal structure being responsive to application of an electric field to align with respect thereto to reduce such scattering or absorption.

18. The projector of claim 1, said imager means being operative to create characteristics of an image on a frame by frame basis for projection.

19. The projector of claim 1, said imager means including a dynamic electrode means for selectively applying charge to the liquid crystal material to create the sequential images.

20. The projector of claim 1, said projection optics means comprising means for projecting the sequential images created by the imager means onto a screen, including a projection lens, light source means for illuminating said liquid crystal imager means, a mask, a shutter and lens system means for projecting an image created by said imager means in response to illumination by said light source means.

21. The projector of claim 1, said imager means comprising liquid crystal material capable of temporarily storing charge to create characteristics of an image on a frame by frame basis that can be projected and charge applicator means selectively operable to apply charge to the liquid crystal material to create the sequential images.

22. The projector of claim 21, said imager means comprising encapsulated liquid crystal material that has a capacitance characteristic which enables charge to be stored on the surface thereof.

23. The projector of claim 21, said charge applicator means comprising electrode means for depositing charge on said liquid crystal material, said liquid crystal material and said electrode means being relatively movable.

24. The projector of claim 21, said charge applicator means being positioned at a charge applying station relatively upstream of the projection optics means.

25. The projector of claim 24, further comprising discharging means for discharging charge from said strip means.

26. The projector of claim 21, further comprising drive means for controlling the charge applicator means to determine at what areas of the liquid crystal material charge is to be applied and at what areas charge is not to be applied.

27. The projector of claim 1, further comprising housing means for containing said imager means and said projection optics means.

28. The projector of claim 1, further comprising motor means to drive said liquid crystal material along a path to bring sequential images thereon into alignment with said projection optics means for projection.

29. The projector of claim 1, said imager means comprising liquid crystal material in a containment medium that tends to distort the natural structure of the liquid crystal in the absence of an electric field to cause scattering or absorption of incident light, and said liquid crystal structure being responsive to application of an electric field to align with respect thereto to reduce such scattering or absorption.

30. The projector of claim 29, said liquid crystal material in a containment medium having structural memory to maintain such aligned condition caused in response to application of electric field.

31. The projector of claim 30, said liquid crystal material comprising operationally smectic liquid crystal.

32. The projector of claim 31, further comprising heater means for applying heat to said liquid crystal material to heat the same above the nematic smectic transition temperature to allow the liquid crystal structure to return to distorted alignment.

33. The projector of claim 30, further comprising means for applying electric field to said liquid crystal material.

34. The projector of claim 33, further comprising means for effecting relative movement of said liquid crystal material and electrode means.

35. The projector of claim 33, wherein said means for applying electric field includes means for depositing electrical charge to a surface area of said liquid crystal material.

36. The projector of claim 35, further comprising discharge means for discharging charge from said liquid crystal material.

37. The projector of claim 33, said means for applying electric field comprising electrode means for subjecting said liquid crystal material to electric field.

38. A projector, comprising
projecting means for projecting respective images,
a substantially continuous transfer medium means for conveying to said projection means respective sets of image characteristics for projection by said projecting means,
said transfer medium means having a storage capability for storing at plural locations thereof respective sets of image characteristics for projection and being capable of being re-written at such respective areas with the same or different respective sets of image characteristics, and
said transfer medium means comprising liquid crystal material having structural characteristics responsive to a prescribed input to create such image characteristics.

39. The projector of claim 38, said liquid crystal material comprising a continuous strip of liquid crystal in a containment medium.

40. The projector of claim 38, said liquid crystal material being capable of temporarily storing electrical charge to create such image characteristics.

41. The projector of claim 40, said liquid crystal material comprising operationally nematic liquid crystal.

42. The projector of claim 38, said liquid crystal material comprising operationally smectic liquid crystal.

43. The projector of claim 42, further comprising electrical means for applying electric field to said liquid crystal to effect alignment of liquid crystal structure relative to such electric field to maximize transmission of light through such liquid crystal material while substantially minimizing refraction of light.

44. The projector of claim 43, further comprising containment medium means for containing said liquid crystal in plural volumes, said containment medium means including surface means for distorting the structure of said liquid crystal.

45. The projector of claim 43, further comprising means for applying thermal energy to said liquid crystal material to cause the same to undergo distorted structural alignment to tend to refract light incident on such liquid crystal and containment medium means.

46. The projector of claim 38, further comprising electrical means for applying electric field to said liquid crystal to effect alignment of liquid crystal structure relative to such electric field to maximize transmission of light through such liquid crystal material while substantially minimizing refraction of light.

47. The projector of claim 38, further comprising means for effecting relative movement between said disk-like structure and said projection optics means thereby sequentially to bring respective information to said projection optics for projection thereby.

48. The projector of claim 38, wherein said liquid crystal material comprises liquid crystal material in a containment medium that tends to distort the structure of the liquid crystal to cause scattering or absorption of incident light, said liquid crystal being responsive to application of an electric field to align with respect thereto to reduce such scattering or absorption.

49. The projector of claim 48, wherein said liquid crystal material has a memory characteristic whereby after the structure thereof has been aligned with respect to an electric field such alignment is maintained even after removal of such field until a further prescribed input is provided the liquid crystal material.

50. The projector of claim 49, wherein such further prescribed input is thermal energy.

51. The projector of claim 38, further comprising input means for at least one of writing or erasing information with respect to said liquid crystal material for projection by said projection optics means.

52. The projector of claim 51, said input means comprising means for subjecting selected portions of said liquid crystal material to electric field.

53. The projector of claim 52, said means for subjecting comprising means for supplying electrical charge to at least a surface portion of said liquid crystal material.

54. The projector of claim 53, said means for supplying comprising electrode means for temporary engagement with said liquid crystal material to apply charge thereto.

55. The projector of claim 53, said means for supplying comprising means for supplying a beam of electrons directed toward said liquid crystal material.

56. The projector of claim 51, said input means comprising means for subjecting selected portions of said liquid crystal material to thermal energy.

57. The projector of claim 56, said means for subjecting comprising a laser for directing laser radiation to said liquid crystal material.

58. The projector of claim 38, said transfer medium means being operative to create image characteristics on a frame by frame basis for projection.

59. The projector of claim 38, said projecting means comprising means for projecting the sequential images created by the imager means onto a screen, including a projection lens, light source means for illuminating said liquid crystal imager means, a mask, a shutter and lens system means for projecting an image created by said imager means in response to illumination by said light source means.

60. The projector of claim 38, said liquid crystal material comprising encapsulated liquid crystal material that has a capacitance characteristic which enables charge to be stored on the surface thereof, and further comprising charge applicator means for applying electrical charge to selected surface area portions of said liquid crystal material.

61. The projector of claim 60, further comprising discharging means for discharging charge from said liquid crystal material.

62. The projector of claim 38, further comprising motor means to drive said liquid crystal material along a path to bring sequential images thereon into alignment with said projecting means for projection.

63. The projector of claim 38, said liquid crystal material comprising liquid crystal in a containment medium that tends to distort the natural structure of the liquid crystal in the absence of an electric field to cause scattering or absorption of incident light, and said liquid crystal structure being responsive to application of an electric field to align with respect thereto to reduce such scattering or absorption, said liquid crystal material in a containment medium having structural memory to maintain such aligned condition caused in response to application of electric field.

64. The projector of claim 63, further comprising heater means for applying heat to said liquid crystal to heat the same above the nematic smectic transition temperature to allow the liquid crystal structure to return to distorted alignment.

65. A liquid crystal device, comprising
utilizing means for utilizing information from a liquid crystal transfer medium,
a substantially continuous transfer medium means for providing information for utilization by said utilizing means in the form of respective sets of characteristics utilizable by said utilizing means,
said transfer medium means having a storage capability for storing at plural locations thereof respective sets of utilizable characteristics for utilization and being capable of being re-written at such respective areas with the same or different respective sets of utilizable characteristics, and
said transfer medium means comprising liquid crystal material having structural characteristics responsive to a prescribed input to create such utilizable characteristics.

66. The device of claim 65, wherein said utilizing means comprising a projecting means for projecting respective images, and said transfer medium means being operative to form sets of image characteristics for projection.

67. A method of projecting plural images in sequence, comprising:
creating an image or characteristics of an image in a liquid crystal material,
storing such image in such liquid crystal material,
directing light at such liquid crystal material,
projecting such image as a function of light transmitted through or scattered by such liquid crystal material, and
creating a further image in such liquid crystal material for subsequent projection.

68. The method of claim 67, wherein such liquid crystal material has structural storage properties, and said storing comprising causing the structure of such liquid crystal material to assume and to maintain a prescribed structural alignment in the absence of externally applied input.

69. The method of claim 68, such liquid crystal material comprising liquid crystal in a containment medium that in the absence of prescribed input tends to distort the liquid crystal structure to increase scattering or absorption of incident light, and said storing comprising applying electric field to the liquid crystal to cause the structure thereof to align with respect to such field.

70. The method of claim 62, further comprising erasing the image from such liquid crystal material prior to creating a further image.

71. The method of claim 67, such liquid crystal material comprising liquid crystal in a containment medium that in the absence of prescribed input tends to distort the liquid crystal structure to increase scattering or absorption of incident light, and said storing comprising applying electric charge to a surface of such liquid crystal material to apply electric field to the liquid crystal thereby causing the structure thereof to align with respect to such field.

72. The method of claim 71, further comprising erasing the image from such liquid crystal material prior to creating a further image, said erasing comprising discharging charge from at least a portion of such liquid crystal material prior to formation of an image thereat.

73. The method of claim 67, such liquid crystal material comprising smectic liquid crystal material, and further comprising erasing the image from such liquid crystal material prior to creating a further image, said erasing comprising heating such liquid crystal material above the nematic smectic transition temperature.

74. The method of claim 67, wherein such liquid crystal material comprises an endless strip of liquid crystal in a containment medium, said creating steps comprising creating images at plural areas of such strip, and further comprising sequentially moving such respective areas into projecting means sequentially to project such images.

75. The method of claim 67, wherein the liquid crystal material comprises liquid crystal in a containment medium, and said creating comprises applying electric charge to the liquid crystal material for storage thereon to apply electric field to such liquid crystal.

76. The method of claim 75, said applying electric charge comprising directing an electron beam at such liquid crystal material.

* * * * *

UNITED STATES PATENT AND TRADEMARK OFFICE
CERTIFICATE OF CORRECTION

PATENT NO. : 5,061,041
DATED : October 29, 1991
INVENTOR(S) : James L. Fergason

Page 1 of 6

It is certified that error appears in the above-indentified patent and that said Letters Patent is hereby corrected as shown below:

ON THE TITLE PAGE:

ITEM [56] REFERENCE CITED, UNDER OTHER PUBLICATIONS

Add to the References cited Clark, W.D. "Copier Printhead," IBM Technical Disclosure Bulletin, V19, N7, December 1976.

IN THE DRAWINS:

Drawing sheet 1, Fig. 1, the reference numeral 1 should be applied generally to the motion picture projector; and, the reference numeral 2 should be applied generally to the imager, as shown on the attached page.

Drawing sheet 4, Fig. 11, the reference numeral 324 should be applied generally to the aperture, and the reference numeral 332 should be applied to the aperture opening, as shown on the attached page.

UNITED STATES PATENT AND TRADEMARK OFFICE
CERTIFICATE OF CORRECTION

PATENT NO. : 5,061,041
DATED : October 29, 1991
INVENTOR(S) : James L. Fergason

It is certified that error appears in the above-identified patent and that said Letters Patent is hereby corrected as shown below:

Column 3, line 41, after "refraction" insert --of--.

Column 4, line 46, delete "seet" and substitute --set--.

Column 4, line 47, delete "interchangeable" and substitute --interchangeably--.

Column 7, line 21, delete "means" and substitute --mean--.

Column 7, line 29, delete "means" and substitute --mean--.

Column 8, line 64, delete "match" and substitute --matched--.

Column 10, line 64, delete "as" and substitute --are--.

Column 12, line 23, delete "cathod" and substitute --cathode-.

Column 13, line 26, delete "projection" and substitute --projector--.

Column 14, line 33, change "4'" to --4a--.

Column 14, line 37, change "4'" to --4a--.

Column 17, line 31, change "5" to --25--.

Column 17, line 65, delete "constraing" and substitute --constraint--.

Column 17, line 66, delete "orgainized" and substitute --organized--.

Column 24, line 8, after "monitoring" add --the-.

Column 24, line 8, delete "monitoring" and substitute --monitors--.

UNITED STATES PATENT AND TRADEMARK OFFICE
CERTIFICATE OF CORRECTION

PATENT NO. : 5,061,041
DATED : October 29, 1991
INVENTOR(S) : James L. Fergason

It is certified that error appears in the above-identified patent and that said Letters Patent is hereby corrected as shown below:

Column 24, line 45, change "applycharge" to --apply charge--.

Column 24, line 65, change "applysurface" to --apply surface--.

Column 25, line 64, change "14" to --11--.

Column 26, line 32, change "extra ordinary" to --extraordinary--.

Column 26, line 47, delete "approriate" and substitute --appropriate--.

Column 28, line 41, delete "projection" and substitute --projector--.

Column 28, line 42, delete "projection" and substitute --projector--.

Column 28, line 59, delete "projection" and substitute --projector--.

Column 28, line 66, change "321" to --358--.

Column 32, line 4, delete "discharte" and substitute --discharge-- .

Column 32, line 8, delete "charte" and substitute --charge--.

Column 32, line 11, delete "charage" and substitute --charge--.

Column 34, line 33, delete "stuctureal" and substitute --structural--.

Column 34, line 36, delete "below" and substitute --above--.

UNITED STATES PATENT AND TRADEMARK OFFICE
CERTIFICATE OF CORRECTION

PATENT NO. : 5,061,041

DATED : October 29, 1991

INVENTOR(S) : James L. Fergason

It is certified that error appears in the above-identified patent and that said Letters Patent is hereby corrected as shown below:

Claim 38, Column 37, line 46; delete "projection" and substitute --projecting--.

Claim 51, Column 38, line 46; delete "projection" and substitute --projecting--.

Claim 51, Column 38, line 46; delete "optics".

Claim 70, Column 40, line 25; change "62" to --67--.

Signed and Sealed this

Fifteenth Day of March, 1994

Attest:

BRUCE LEHMAN

Attesting Officer     Commissioner of Patents and Trademarks